United States Patent [19]
Gross et al.

[11] Patent Number: 6,119,111
[45] Date of Patent: Sep. 12, 2000

[54] NEURO-PARITY PATTERN RECOGNITION SYSTEM AND METHOD

[75] Inventors: Kenneth C. Gross, Bolingbrook; Ralph M. Singer, Naperville, both of Ill.; Rollin G. Van Alstine, Lecanto, Fla.; Stephan W. Wegerich, Glendale Heights; Yong Yue, Chicago, both of Ill.

[73] Assignee: ARCH Development Corporation, Chicago, Ill.

[21] Appl. No.: 09/094,413

[22] Filed: Jun. 9, 1998

[51] Int. Cl.$^7$ ........................................ G06F 15/18
[52] U.S. Cl. ................................... 706/15; 706/26
[58] Field of Search .......................... 706/15, 26

[56] References Cited

U.S. PATENT DOCUMENTS

| | | | |
|---|---|---|---|
| 4,761,748 | 8/1988 | Le Rat et al. | 714/822 |
| 5,223,207 | 6/1993 | Gross et al. | 376/216 |
| 5,410,492 | 4/1995 | Gross et al. | 702/185 |
| 5,459,675 | 10/1995 | Gross et al. | 702/183 |
| 5,548,686 | 8/1996 | Deville | 706/41 |
| 5,586,066 | 12/1996 | White et al. | 702/181 |
| 5,629,872 | 5/1997 | Gross et al. | 70/209 |
| 5,761,090 | 6/1998 | Gross et al. | 706/45 |
| 5,764,509 | 6/1998 | Gross et al. | 364/149 |
| 5,774,379 | 6/1998 | Gross et al. | 702/72 |

OTHER PUBLICATIONS

A. Miron, "Interim Progress Report, Application of MSET to the Analysis of Nuclear Power Plant Feedwater Flow System," Nov. 1, 1997.
J.P. Herzog, et al., "Theoretical Basis of the Multivariate State Estimation Technique (MSET)," ANL Intra–Laboratory Memo, Sep. 4, 1997.
L. Fausett, "Fundamentals of Neural Networks", Prentice–Hall, Inc., 1994.
C.H. Meijer, et al., "On–Line Power Plant Signal Validation Technique Utilizing Parity–Space Representation and Analytic Redundancy", NP–2110, Research Project 1541, Final Report, Nov. 1981.
X.J. Zhang and M.B. Zarrop, Auxiliary signals for improving On–line Fault Detection, IEEE International Conf. on Control, pp. 414–419, 1988.
D.P. Malladi and J.L. Speyer, A Generalized Shiryayev Sequential Probability Ratio Test for Change Detection and Isolation, Proceedings of the 35th IEEE Conf. on Decision and Control, vol. 3, pp. 3115–3122, Dec. 1996.
Roh Myung–Sub et al., Thermal Power Prediction of Nuclear Power Plant Using Neural Network and Parity Space Model, IEEE Trans. on Nuclear Science, vol. 38, issue 2, pp. 866–872, Apr. 1991.
P. Belle et al., Detection and Isolation of Sensor Faults on Nonlinear Processes Based on Local Linear Models, Proc. of the 1997 American Control Conference, vol. 1, pp. 468–472, Jun. 1997.
D. Fussel and P. Balle, Combining Neuro–Fuzzy and Machine Learning for Fault Diagnosis of a DC Motor, Proc. of the 1997 American Control Conference, vol. 1, pp. 37–41, Jun. 1997.

*Primary Examiner*—Tariq R. Hafiz
*Assistant Examiner*—Michael Pender
*Attorney, Agent, or Firm*—Michael D. Rechtin; Foley & Lardner

[57] ABSTRACT

A method and system for monitoring a process and determining its condition. Initial data is sensed, a first set of virtual data is produced by applying a system state analyzation to the initial data, a second set of virtual data is produced by applying a neural network analyzation to the initial data and a parity space analyzation is applied to the first and second set of virtual data and also to the initial data to provide a parity space decision about the condition of the process. A logic test can further be applied to produce a further system decision about the state of the process.

17 Claims, 18 Drawing Sheets

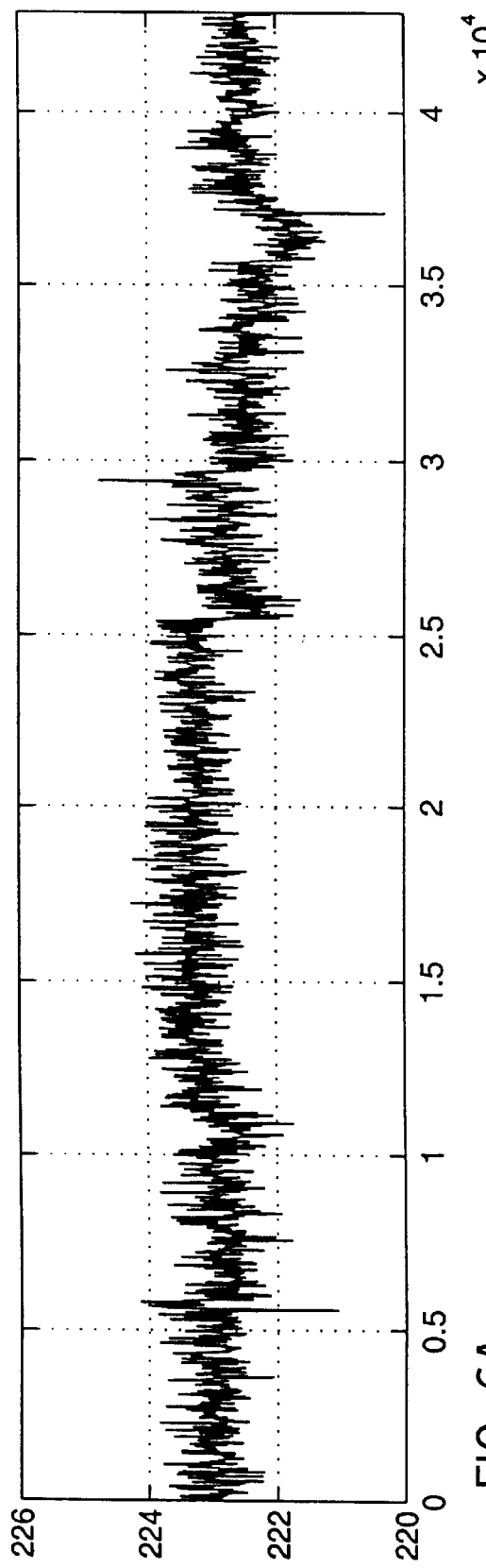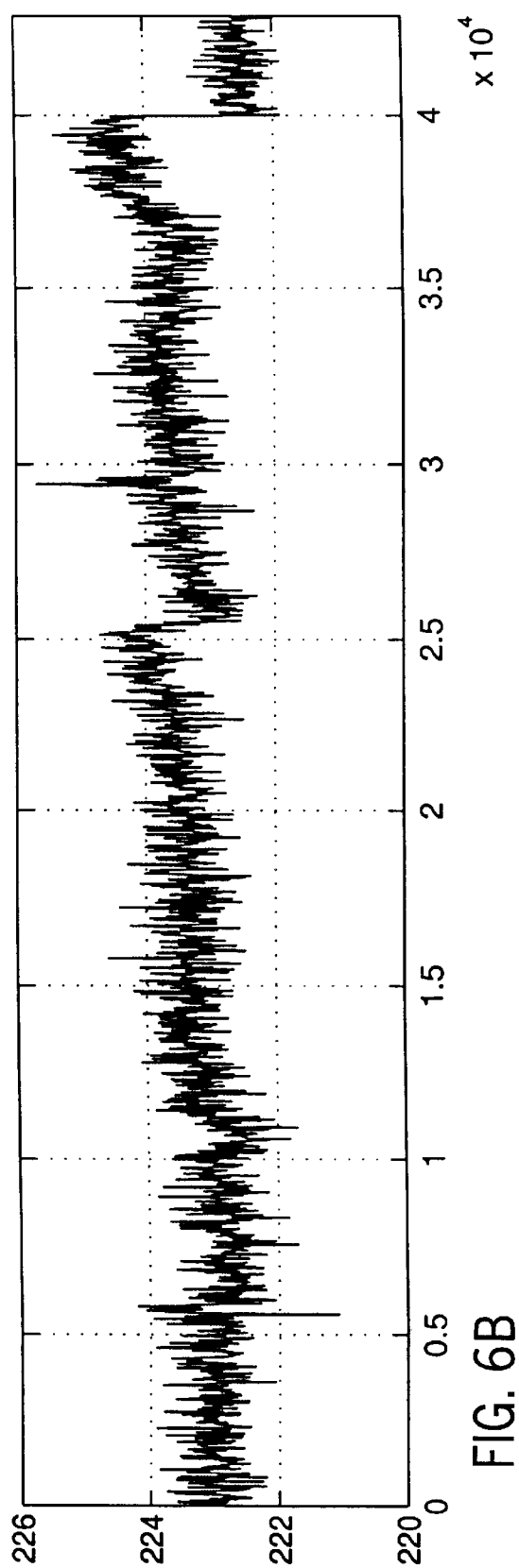

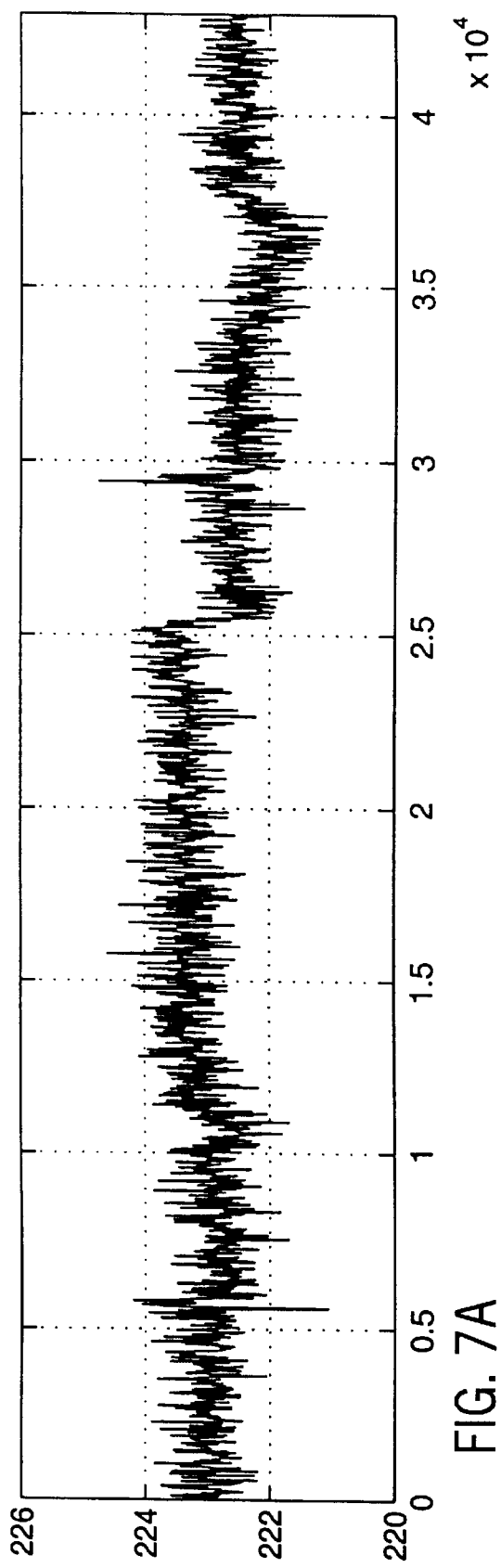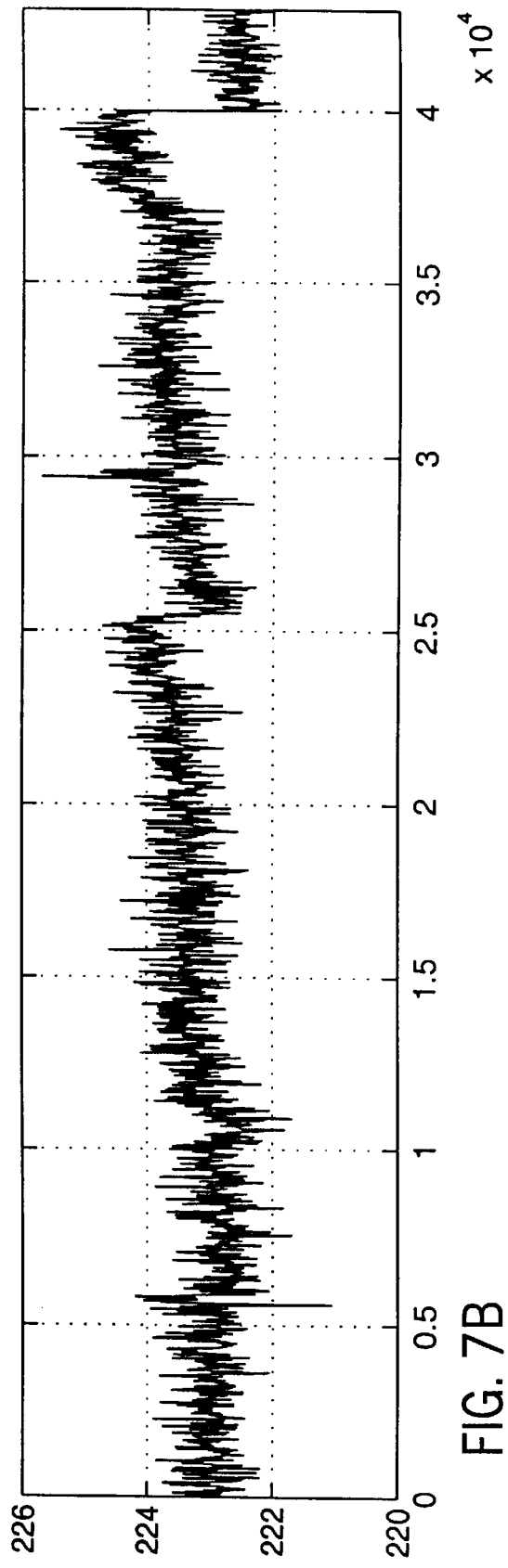

NEURO-PARITY PATTERN RECOGNITION SYSTEM AND METHOD

This invention was made with Government support under Contract No. W-30-109-ENG-38 awarded by the Department of Energy. The Government has certain rights in this invention.

The present invention is generally directed to a method and system of process monitoring using a combination of at least one state estimation technique and at least one pattern recognition technique to sense anomalies in complex physical, chemical and biological systems. More particularly, a Neuro-Parity Pattern Recognition (NPPR) system and method uses a synergistic combination of analytically redundant nonlinear system state estimation techniques that have been integrated with a combination of extremely sensitive pattern recognition methodologies to detect the onset of sensor or process degradation or degradation or deviation of data sources in complex non-linear systems, such as in electric utility, industrial, biomedical, business, financial and transportation applications. These combinations of techniques combine the best features of artificial neural networks with a new nonlinear state estimation methodology, resulting in a system with the ability to create synthesized "virtual" sensors or sources of "virtual" data based on database models. The virtual sensor signals and actual sensor signals are then used as input to parity space enhanced sequential probability ratio test ("SPRT" hereafter) pattern recognition module. It can then be determined whether any of the actual sensors or data sources have failed or if there are any anomalies or characteristic changes in the overall process of the system being surveilled. For example, for the very demanding task of nuclear plant sensor and process surveillance applications, the system and methods of the invention offer the features of redundancy and diversity, which are consistent with the strict regulatory philosophy of the Nuclear Regulator Commission. For non-nuclear applications, the invention offers ultrahigh sensitivity for safety critical and mission critical applications.

Complex and sophisticated systems are needed to carry out modern industrial, biological, financial, meteorological and military applications. Substantial progress has been made in providing systems to carry out these tasks, but as technology advances so must the means to monitor and regulate the increasingly complex systems being used. The principal means to accomplish such tasks is through use of computer hardware and software which have become powerful tools.

OBJECTS OF THE INVENTION

It is therefore an object of the invention to provide an improved method and system for monitoring and regulating complex processes.

It is another object of the invention to provide a novel method and system for utilizing selected combinations of system state estimation techniques and pattern recognition techniques to optimize surveillance of complex processes.

It is also an object of the invention to provide an improved method and system for applying a unique nonlinear state estimation technique to monitor complex systems, including industrial, biological, financial, avionics, vehicular, meteorological and military systems.

It is yet another object of the invention to provide a novel method and system using a combination of a multivariate system estimation technique, a neural network technique and a parity space technique to perform sensitive surveillance and control of complex processes.

It is still another object of the invention to provide an improved method and system for creating virtual or synthesized signals to increase information available to a pattern recognition module, the virtual or synthesized signals created by neural network and also by a novel type of nonlinear state estimation technique.

These and other objects, features and advantages of the invention will be apparent from the following description of the preferred embodiments and examples, taken in conjunction with the accompanying drawings described below.

SUMMARY OF THE INVENTION

The NPPR system in its most preferred form uses a combination of a virtual signal synthesizer module and a parity space enhanced SPRT module. The virtual signal synthesizer module is used to create analytically redundant sensor or data signals. These signals are then used with the actual sensor signals or data to increase the amount of information content available to the pattern recognition module, which in turn increases the reliability of the monitoring system. The redundant signals are synthesized using two different techniques; one technique is based on neural networks and the other is based on a new type of nonlinear state estimation methodology. In the case of the neural network, a database containing all of the sensors signals being monitored is used to train the network. The database contains sensor signals or data representative of all modes of normal operation of the system being monitored. The network is trained so that for every sensor signal used as input, a corresponding synthesized sensor signal or data is generated continuously in real time. The output is the prediction of what the network "thinks" the "true" operating state of the system is. In the case of the nonlinear state estimation methodology, the same database is used but only a small number of the observations are necessary. The methodology then utilizes it's memory of the learned states of the system in conjunction with a single new observation to provide an estimate of the current "true" operating state of the system. Based on this information the corresponding virtual signals are synthesized. The nonlinear state estimation methodology and the neural network both produce analytically redundant sensor signals or data for all signals or data being monitored.

In the parity space enhanced SPRT module, the SPRT and the parity space techniques are used as the decision making inference engines in the NPPR system. For each signal being monitored there are also two analytically redundant signals, one from the nonlinear state estimation algorithm and one from the neural network. All unique pairs of these three signals are then used to calculate difference functions used as input to the parity space enhanced SPRT module. The SPRT technique is a well known, highly sensitive pattern recognition methodology used to monitor the statistical characteristics of the difference functions. The SPRT technique will provide an annunciation any time a difference function appears to show a divergence from normal learned operating conditions. The parity space methodology is used to project each of the difference signals into a region of the parity space. The parity space is divided into several regions corresponding to different possible modes of failure. The parity space technique results and the SPRT results are used together to make an extremely reliable decision about the operating conditions of the overall system being monitored. These results are also used to determine the reliability of the nonlinear state estimation algorithm and the reliability of the neural network. Depending on which pairs give rise to the annunciation, a decision is made that either a sensor is failing, the process is degrading, the neural network is currently unreliable or the nonlinear state estimation methodology is currently unreliable. If the decision is that a sensor has failed or a data source i unreliable, one of the synthesized sensor signals or data is swapped into the system and is used as a replacement. Another use of the parity space enhanced SPRT module is to determine the severity of degradation or deviation. A SPRT decision ratio is calculated over time to keep track of failure decision frequency versus total decision frequency (normal operation+failure). This ratio is then mapped into a separate parity space whose decision regions are an indication of the severity of failure. By using all of the information obtained in each of the sub-modules in the parity space enhanced SPRT module, the overall surveillance system is extremely reliable and robust.

DETAILED DESCRIPTION OF PREFERRED EMBODIMENTS

Figure 1:
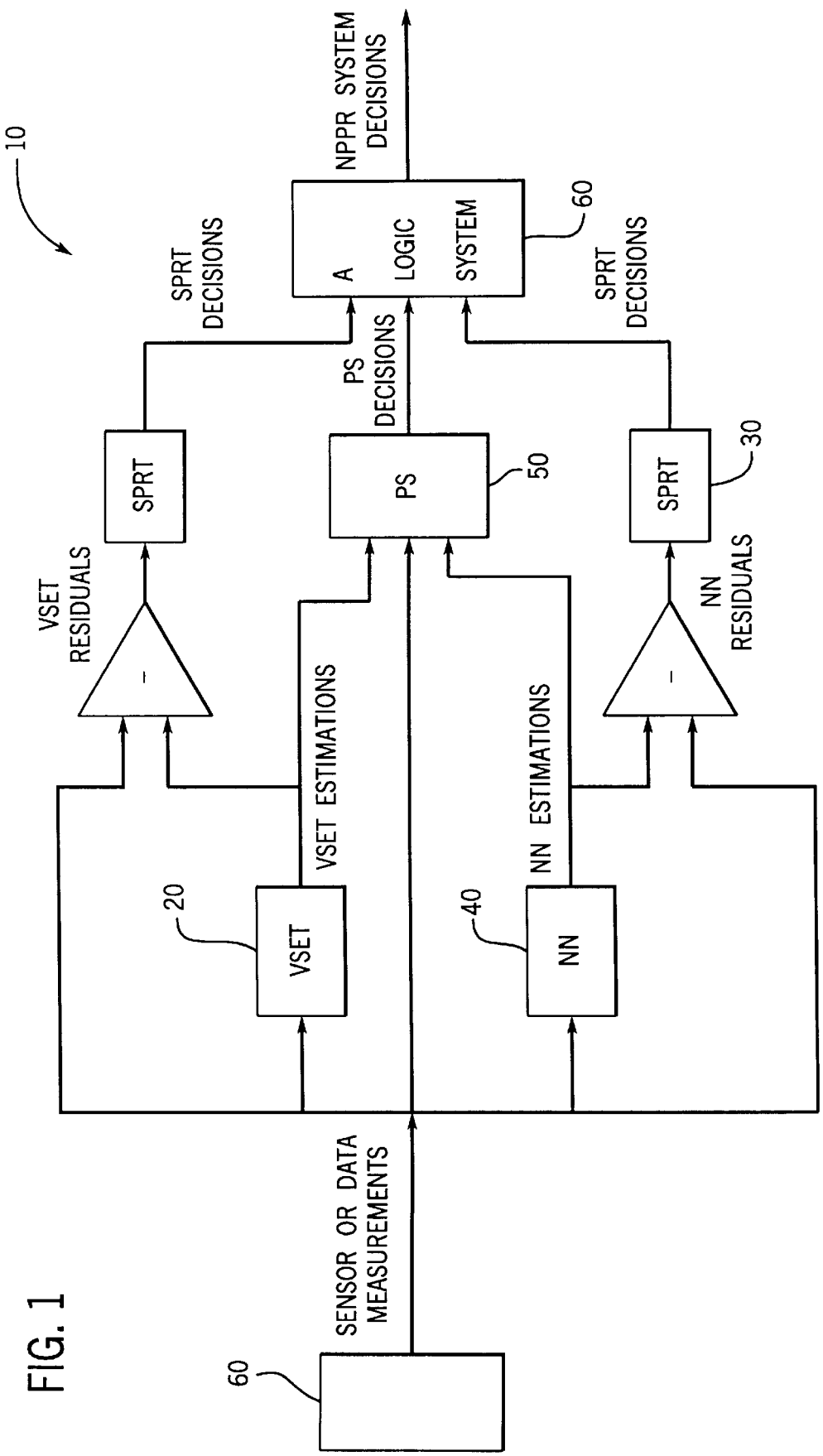
FIG. 1 illustrates a flow diagram describing a preferred embodiment of the invention.

A preferred form of the NPPR system 10 is shown generally in FIG. 1 and combines three major techniques which include (1) a multivariate state estimation ("MSET") technique, which preferably includes a vector similarity evaluation technique ("VSET") 20 and sequential probability ratio test ("SPRT") 30 and also (2) Neural Networks ("NN") 40, and (3) parity space ("PS") 50 methodologies. Further details of the MSET technique can be ascertained by reference to U.S. Ser. No. 08/666,938 assigned to the assignee of the application and which is incorporated by reference herein. More specifically, the system 10 has the two estimation techniques, the VSET 20 and the NN 40, running in parallel and processing the same input signals obtained from the process variables of a monitored system. The estimations of the two techniques, together with the original input signals, are then used as inputs for the PS 50. By comparison of its inputs, the PS 50 will indicate, for each process variable, whether there is a failure, and if so, which estimation technique or the variable itself has failed. When the module outputs a value of −1 the PS has made a decision that everything is normal. If the PS decision module outputs a value that is equal to 1 then the actual sensor measurement does not agree with one of the VSET or NN estimates. If the value is 1.5 then the sensor measurement does not agree with either of the estimates. In addition, the PS 50 will generate its own estimations of the process variables based on its inputs. While the PS 50 is processing its inputs, the SPRTs 30 are conducted on the residuals (the differences between an input and its estimate) of the VSET 20 and the NN 40, respectively. Finally, a logic test is performed via logic system 60 on the decisions of both the SPRTs 30 and the PS 50, to which different weights may be assigned. The output of this logic system 60 will be the NPPR system decision about whether any one of the estimation techniques has generated a false alarm and/or any process variable(s) has failed.

The logic system (LS) 60 for the NPPR has three inputs, the SPRT decisions from the VSET 20, the SPRT decisions from the NN 40, and the PS decisions from the PS 50. These inputs are used to determine the severity of a failure or to weed out any false alarms. If only one out of the three inputs indicates a failure then the LS 60 determines that there is not enough evidence to annunciate any warnings or alarms. If any two of the inputs to the LS 60 indicate failures within the same time window a warning alarm in annunciated. If all three inputs indicate failures in the same time window then the LS 60 annunciates a failure alarm. The three major systems comprising the preferred NPPR system 10 are described hereinafter in detail.

As described hereinbefore, the MSET system is composed of two core methods, which are a system estimation technique, such as the VSET 20 and the SPRT 30. The VSET 20 can be represented mathematically by the following four equations:

$$A = D^T \otimes Y \tag{1}$$

$$G = D^T \otimes D \tag{2}$$

$$W = G^{-1} \cdot A \tag{3}$$

$$\hat{Y} = D \cdot W = D \cdot (D^T \otimes D)^{-1} \cdot (D^T \otimes Y) \tag{4}$$

where,

Y represents an m-dimensional observation vector of a system 60 under surveillance, with the m elements representing system parameters, such as temperature, pressure, flow, and other variables. D represents an m×n data matrix with n-column vectors representing accurately known states of the system 60. It is obtained during the training of the estimation system, and it should include all the major normal operation modes of the system 60 under surveillance. Note that the matrix D is often called a process memory matrix. Y_hat represents the system estimation of Y.

The operation ⊗ in equation (3) depicts the following operation:

$$a_i = 1 - \frac{\|d_i - Y\|}{\|d_i\| + \|Y\|} \tag{5}$$

$$\text{where } d_i \triangleq i^{th} \text{ column of } D \tag{6}$$

$d_i$ is the $i^{th}$ column of the matrix D, and $y$ is the input vector Y. More specifically, using the operator ⊗, the similarity between two vectors is the ratio of the norm of the difference between the two to the sum of their magnitudes. As a result, the $i^{th}$ element $a_i$, of vector A represents the degree of similarity between $D(:,i)$ and Y. The more similar the two vectors are, the closer $a_i$, is to one. Likewise, the more dissimilar the two vectors are, the closer $a_i$ is to zero. By measuring Y against each column vector stored in D, we can obtain vector A, which can be regarded as a unique similarity pattern for Y showing the overall relationship between Y and all the column vectors in D. No other vector has identical similarity pattern of Y, unless it is equal to Y. In the same fashion, the equation (2) computes similarities among all the column vectors (operational states) of matrix D. The $ij^{th}$ element ($g_{ij}$) of the n×n square matrix G represents the degree of similarity between vectors $D(:,i)$ and $D(:,j)$, and were $G(;,i)$ is the similarity pattern for $D(:,i)$, showing the relationship of $D(:,i)$ to all the column vectors in D including itself. The matrix $G^{-1}$, the inverse of G, has special importance in the estimation process. Geometrically, a column vector $G(:,i)$ in G is orthogonal to all the column vectors in $G^{-1}$, except from $G^{-1}$ $(:,i)$, for which the inner product is equal to one. If the input vector Y is close to one of the column vectors of D, such as $D(:,i)$, the similarity pattern A for Y is close to $G(:,i)$. Consequently, all the elements of the weight vector W for Y, obtained by using equation (8), are small except from the $i^{th}$ element $w_p$, which is a large positive value relative to all the other elements of W. Since based on the equation (9), the VSET estimation of Y is a linear combination of all the column vectors in matrix D to which weights are assigned according to weight vector W, the VSET estimation of Y will be most similar to $D(:,i)$ in the above case. If input vector Y is equal to $D(:,i)$, the similarity pattern A of Y is the same as that of $D(:,i)$, all the elements of W are zeros except from $w_p$ which is one, and the VSET estimate is identical to Y.

The SPRT 30 is a well known statistical likelihood test that can be used to make a choice between two statistical hypotheses. The two hypotheses are compared against each other, similar to flipping a coin—it is either the head or the tail. In our case, for a mean SPRT, the two hypotheses are $H_0$ and $H_1$; $H_0$ indicates that the difference between sensor measurement and system estimation is normally distributed with nonzero mean and variance $\sigma^2$, while $H_1$ means that the difference between the sensor measurement and system estimation is normally distributed with zero mean and variance $\sigma^2$. The SPRT 30 chooses between $H_0$ and $H_1$ based on a statistical test on the probability density function of the difference between sensor measurement and system estimation. If the monitored system operates normally, the SPRT 30 should accept hypothesis $H_1$. Otherwise, if there is any system or sensor degradation, the SPRT 30 should accept $H_0$. The test is described by the following conditions and equations:

If $SPRT_{index} \leq A$, accept $H_1$,
If $SPRT_{index} \geq B$, accept $H_0$,
If $A < SPRT_{index} < B$, continue sampling, where $$SPRT_{index} = \frac{M}{\sigma^2} \sum_{k=1}^{n} \left(X_k - \frac{M}{2}\right), \quad (7)$$

$$A = \ln(\alpha/(1-\beta)), \quad B = \ln((1-\alpha)/\beta) \quad (8)$$

$x_k$: the difference calculated point by point between sampled sensor measurement and the system estimation;

A, B are the upper and lower thresholds of the SPRT 30, respectively;

$\alpha, \beta$ are missed-alarm and false-alarm probabilities;

$\sigma^2$ is the variance of the difference function $x_k$, k=1,2, . . . ; and

M is a system disturbance level.

The preceding equations show how the SPRT 30 functions. It will continue to sample the sensor measurement and calculate SPRT indices until the SPRT indices exceed threshold A or B. If $SPRT_{index} \leq A$, we can declare with 100×(1−$\alpha$) percent confidence that $H_1$ is true, or the system under surveillance is operating within the normal range. On the other hand, if $SPRT_{index} \geq B$, we can declare with 100×(1−$\beta$) percent confidence that $H_0$ is true, or there is sensor or system failure(s).

In general, one can regulate the sensitivity of the SPRT 30 by adjusting the values of A, B, or M. For example, increasing the values of A, B, or M increases the average number of samples that the SPRT 30 needs to make a decision. In other words, the SPRT 30 becomes less sensitive to degradation in the monitored system. There are many advantages of using the SPRT 30 for failure detection, including very early annunciation of onset of disturbances due to its high sensitivity, and the fact that the SPRT 30 has user-specifiable false-alarm and missed-alarm probabilities.

Neural networks have been applied to a variety of problems, and they perform especially well when the problems are related to pattern classification and pattern recognition. Moreover, because of the ability of neural networks (1) to deliver good performance when the inputs are noisy and/or incomplete, (2) to quickly recognize specific conditions of a complex system, and (3) to operate when some individual nodes in the network are damaged, they are well-suited for monitoring complex systems in real-time.

Figure 2:
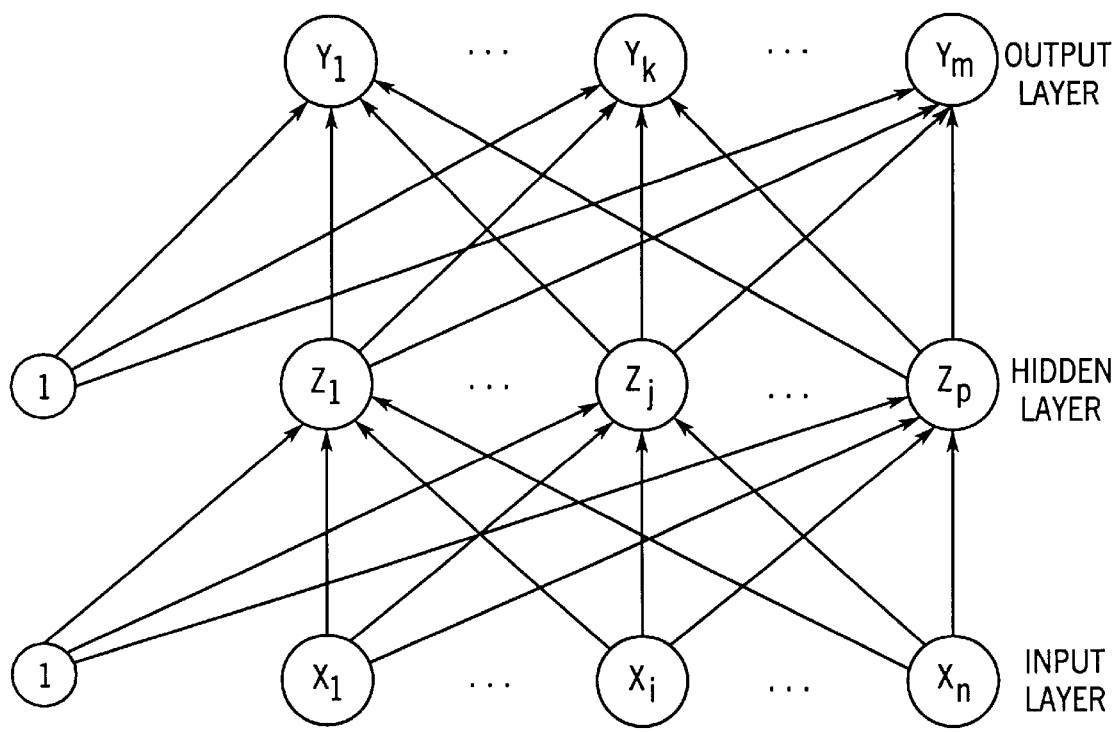
FIG. 2 illustrates a form of back propagation neural network system having one hidden layer.

In general, for the problem of sensor signal or data validation, neural networks treat a vector of numbers, whose elements are the readings of the sensors or data sources of the monitored system 60 taken at a certain moment, as a pattern. Through training on the normal patterns, which have been recorded when the system 60 functions normally (or in a particular state), the NN 40 will provide their estimates based on the inputs and identify failure(s) when the input patterns are sufficiently different from any one of the normal patterns they encountered during the training. For the above kind of applications, the most commonly used type of the NN 40 is a backpropagation type. FIG. 2 displays a typical structure of a three-layer backpropagation neural network. The NN 40 of this type can have more than one hidden layer, and the more hidden layers a neural network has, the more complicated it is, and the more complex system it can model. $X_i$ is input unit i, Z is hidden unit; $Y_k$ is output unit k, $v_{oj}$ is bias on hidden unit j, $w_{ok}$ is bias on output unit k. From an input vector x=($x_1$, . . . $x_i$, . . . $x_n$), an output vector y=($y_1$, . . . $y_i$, . . . $y_n$) is calculated by the following four equations:

The net input to $Z_j$ is denoted $z\_in_j$:

$$z\_in_j = v_{0j} + \sum_i x_i v_{ij} \quad (9)$$

The output signal (activation) of $Z_j$ is denoted $z\_in_j$:

$$z_j = f(z\_in_j) \quad (10)$$

net input to $Y_k$ is denoted $y\_in_k$:

$$y\_in_k = w_{0k} + \sum_j z_j w_{jk} \qquad (11)$$

The output signal (activation) of $Y_k$ is denoted $y_k$:

$$y_k = f(y\_in_k) \qquad (12)$$

where f(x) is called an activation function. The most commonly used activation function for backpropagation neural networks is binary sigmoid function whose range is (0,1) and is defined as $$f(x) = \frac{1}{1+e^{-x}} \qquad (13)$$

From the above equations, it is clear that after an input vector is propagated through the NN 40, it is mapped into an output vector according to the weights and biases of all the nods of the NN 40 established during network training. The mathematical basis of the training algorithm is a gradient descent method which minimizes the total sum squared error of the output computed by the net. More specifically, while it is used only as a feedforward multilayer network during regular operations, during training, the network backpropagates the gradients of its error, which is the rate of change of the differences between the input and the corresponding output patterns in respect to the change of weights, and the weights of the net will be adjusted in the direction of minimizing the total sum squared error.

A parity-space methodology was originally designed to detect inconsistencies among redundant sensor measurements in the field of sensor signal validation. More specifically, by comparing measurements of redundant sensors, to which bounds of normal system operations are assigned, the algorithm isolates failed sensors (system process variables) and generates its estimate of the true value of the system process variable by averaging the measurements of the normal redundant sensors.

The linear relationship between sensor measurements and the true value of a monitored system process, assumed to be a scalar process variable, is given as:

$$\underline{m} = Hx + \underline{\epsilon} \qquad (14)$$

where $\underline{m}$ is the L×1 redundant data vector, whose element $m_i$ for example is the $i^{th}$ direct measurement of a given scalar process variable, where $1 \leq i \leq L$, $H = [1, 1, \ldots 1]^T$ is the measurement matrix, x is the true value of the scalar process variable, and $\underline{\epsilon}$ is the L×1 noise vector associated with the redundant data. We define the $i^{th}$ element of the L×1 residual vector $\underline{\eta}$ as $$\eta_i = m_i - \bar{m} \qquad (15)$$

$$\text{where } \bar{m} = \frac{1}{L}\sum_{i=1}^{L} m_i \qquad (16)$$

For convenience of forming the parity-space algorithm that will be described later, the residuals are rearranged in ascending order in regard to their magnitudes $$|\eta_1| \leq |\eta_2| \leq \ldots \leq |\eta_{L-1}| \leq |\eta_L| \qquad (17)$$

From the above equation, it is clear that the larger $\eta_i$ is, the greater the $i^{th}$ sensor's measurement (or other data source) deviates from the average of $\underline{m}$, and the more likely the $i^{th}$ sensor (or data source) has failed or deviated from a particular system state.

The definition of parity vector is given as, $$\underline{p} = V\underline{m} \qquad (18)$$

where p is the (L−1)×1 parity vector, and V is the (L−1)×1 projection matrix of rank (L−1) having the following properties:

$$VV_T = L_{L-1} \qquad (19)$$

$$VH = 0_{(L-1)\times 1} \qquad (20)$$

$$V_T V = I_L - H(H^T H)^{-1} H^T \qquad (21)$$

where H is the measurement matrix given in equation (14). The vector space formed by $\underline{p}$ is called the parity vector space for the system process variable. The reason for us to apply the parity vector for system estimation and fault isolation is embedded in the definition of the parity vector and its relationship to the residual vector. Based on the properties of the matrix V, it can be shown that, $$\sum_{i=1}^{L} \eta_i^2 = \sum_{i=1}^{L-1} p_i^2 \qquad (22)$$

and the component $p_j$ of the parity vector along the $j^{th}$ process variable's direction in the parity space is, $$p_j = \eta_j \sqrt{\frac{L}{L-1}} \qquad (23)$$

Therefore, according to the definition of the residual vector $\underline{\eta}$ and the equation (22), the magnitude of the parity vector is a measure of the disparity between the various redundant measurements for a system process variable. The greater the magnitude of the parity vector is, the more likely some sensor(s), or data source, has failed or deviated from a particular system state. Using equations (14), (15), and (22), this magnitude is given as, $$p^T p = \sum_{i=1}^{L} \eta_i^2 = \sum_{i=1}^{L} \epsilon_i^2 - \frac{1}{L}\left(\sum_{i=1}^{L} \epsilon_i\right)^2 \qquad (24)$$

The error in each measurement from an unfailed sensor (or data source) is assumed uniformly bounded, i.e., $|\epsilon_i| < b$. In this case it can be shown that, $$\delta_L = \underset{\underline{\epsilon}}{\text{MAX}}\left[\sum_{i=1}^{L} \epsilon_i^2 - \frac{1}{L}\left(\sum_{i=1}^{L} \epsilon_i\right)^2\right] = \begin{cases} Lb^2 & L \text{ even} \\ (L^2-1)\frac{b^2}{L} & L \text{ odd} \end{cases} \qquad (25)$$

The failure (or deviation) of a sensor (or data source) can be detected if the magnitude of the parity vector exceeds the bounds of equation (25). From equations (22) and (23), it also follows that the component orthogonal to the j-th process variable's direction is, $$P_{\perp j}^2 = \sum_{i=1}^{L} \eta_i^2 - \frac{L}{L-1}\eta_j^2 \quad (26)$$

Since the $\eta_i$'s have been ordered according to their magnitudes, the $P_{\perp j}$'s are also ordered, but in the opposite sense:

$$P_{\perp 1}^2 \geq P_{\perp 2}^2 \geq \ldots \geq P_{\perp L}^2 \quad (27)$$

As a result, by calculating the component orthogonal to each sensor measurement's direction in the parity space, we can identify the failed sensor(s) or data source, once the magnitude of the parity vector exceeds the bounds, referring to equation (25), and to estimate the true value for the system process variable. This fault-isolation and estimation methodology is shown below.

If $P_{\perp 1}^2 \leq \delta_{L-1}$, no inconsistency detected, estimate $$\hat{m} = \frac{1}{L}\sum_{i=1}^{L} m_i.$$

Otherwise, if $P_{\perp 2}^2 \leq \delta_{L-1}$, no failure isolated, estimate $\hat{m}=m_1$.

Otherwise, if $P_{\perp 3}^2 \leq \delta_{L-1}$, no failure isolated, estimate $$\hat{m} = \frac{m_1 + m_2}{2}.$$

Otherwise, if $P_{\perp (L-1)}^2 \leq \delta_{L-1}$, no failure isolated, estimate $$\hat{m} = \frac{1}{L-2}\sum_{i=1}^{L-2} m_i.$$

Otherwise, if $P_{\perp L}^2 \leq \delta_{L-1}$, the Lth sensor identified as failed, estimate $$\hat{m} = \frac{1}{L-1}\sum_{i=1}^{L-1} m_i.$$

and the sign of $\eta_L$ is the sign of the failure or deviation. Otherwise, multiple or common-mode failures have occurred and proceed as follows: Reject the $L^{th}$ sensor or data source and compute new residuals:

$$\tilde{\eta}_i = m_i - \frac{1}{L-1}\sum_{j=1}^{L-1} m_j \quad (28)$$

Rearrange the new residuals in order of magnitude, compute $\delta_{L-2}$ from equation (25), and repeat the steps for detection and identification of the (L−1) sensors. This procedure may be continued until the number of remaining sensors is two or a conclusion about identification of a failed sensor or deviate data source has been reached.

Figure 3:
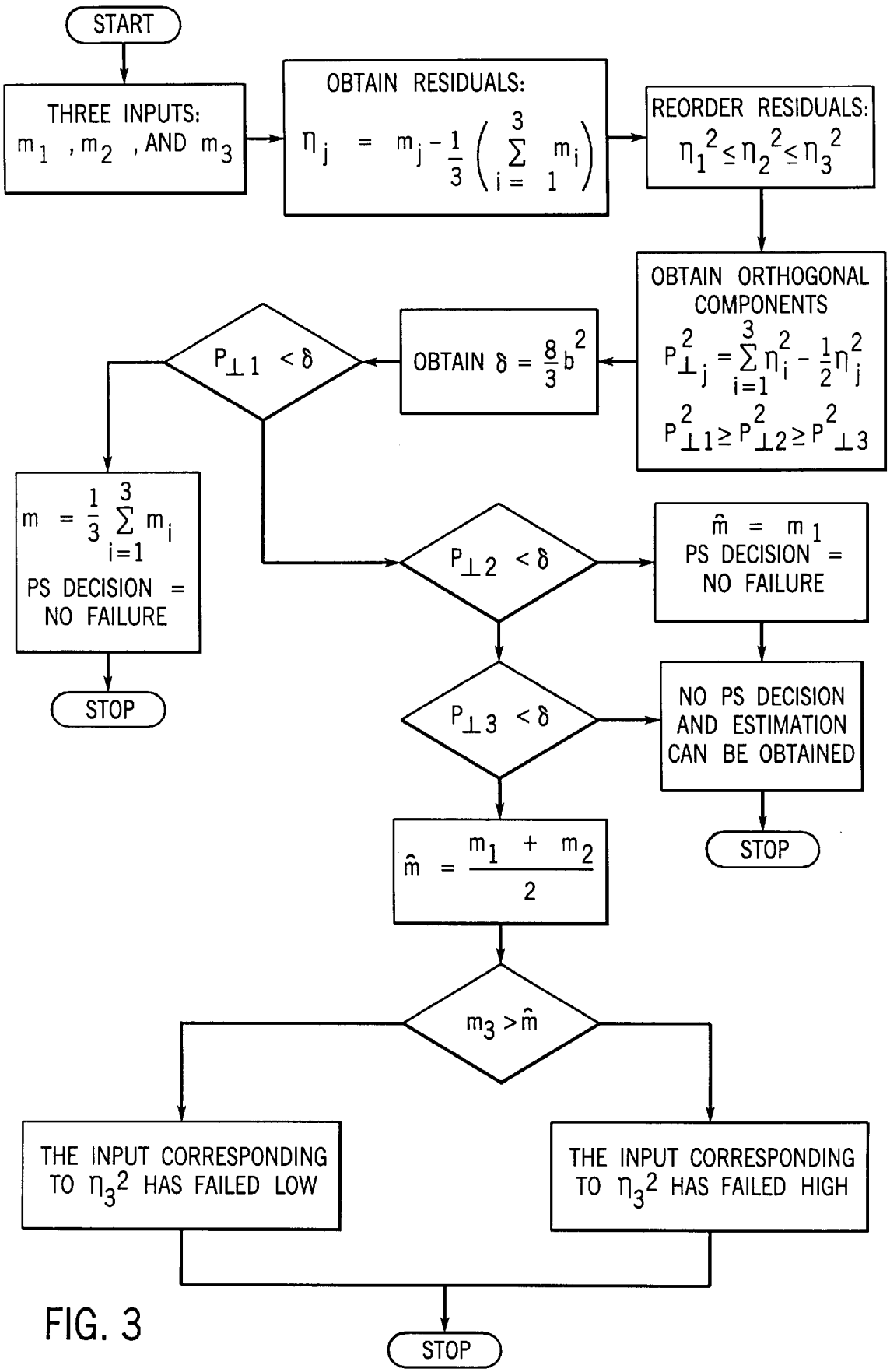
FIG. 3 illustrates a flow diagram of a three sensor input form of a parity space methodology.
Figure 4A:
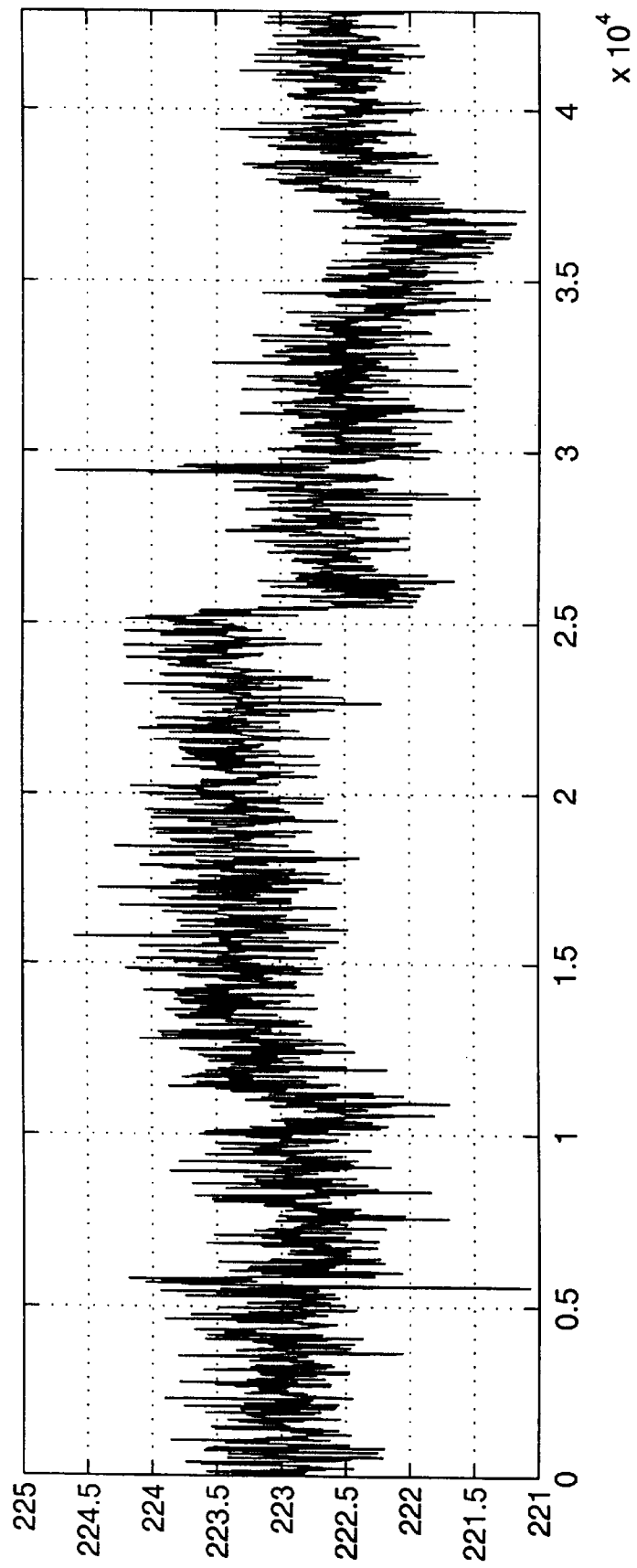
FIG. 4A(i) illustrates a plot of initial data for sensor no. 1, along with FIG. 4A(ii) illustrating system state estimated data.
Figure 4B:
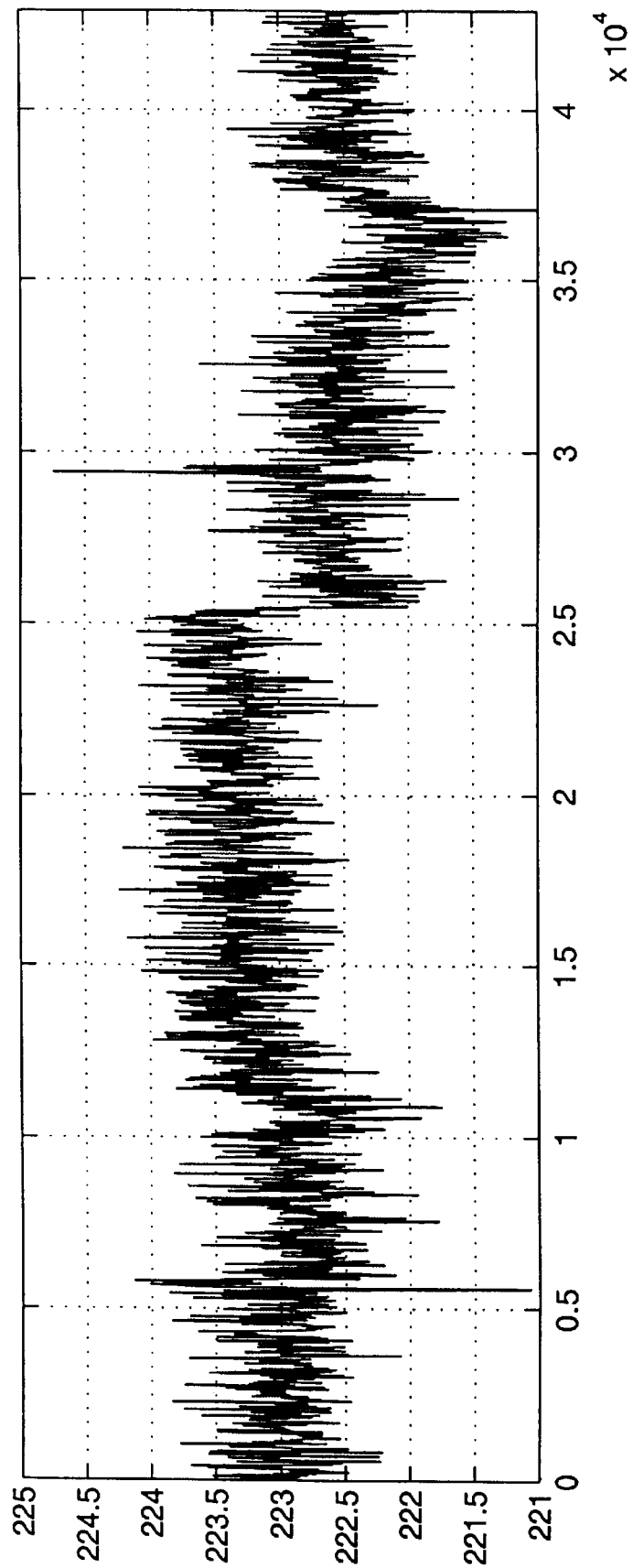
FIG. 4B illustrates a plot of SPRT decisions for the system state residual data.
Figure 4C:
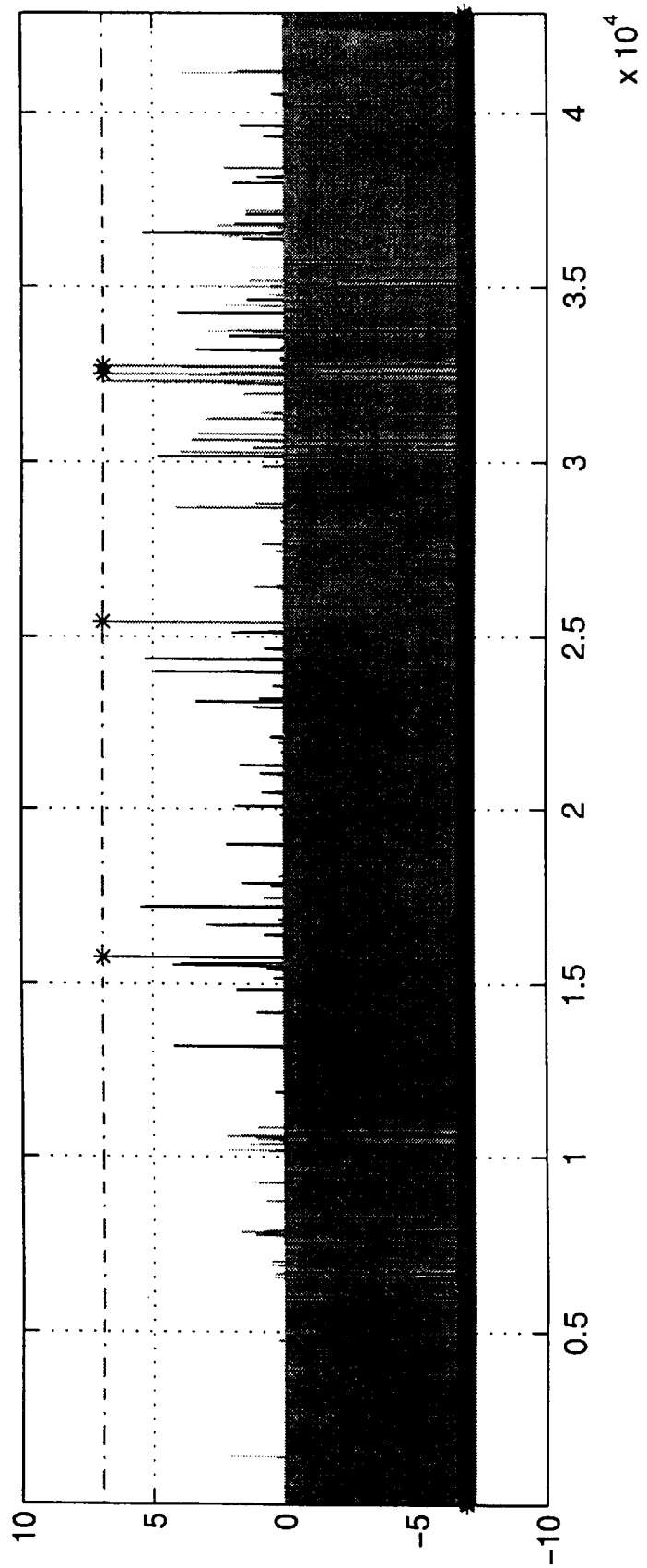
FIG. 4C(i) illustrates a plot of initial data for sensor no. 1 and FIG. 4C(ii) illustrates neural network estimated values.
Figure 4D:
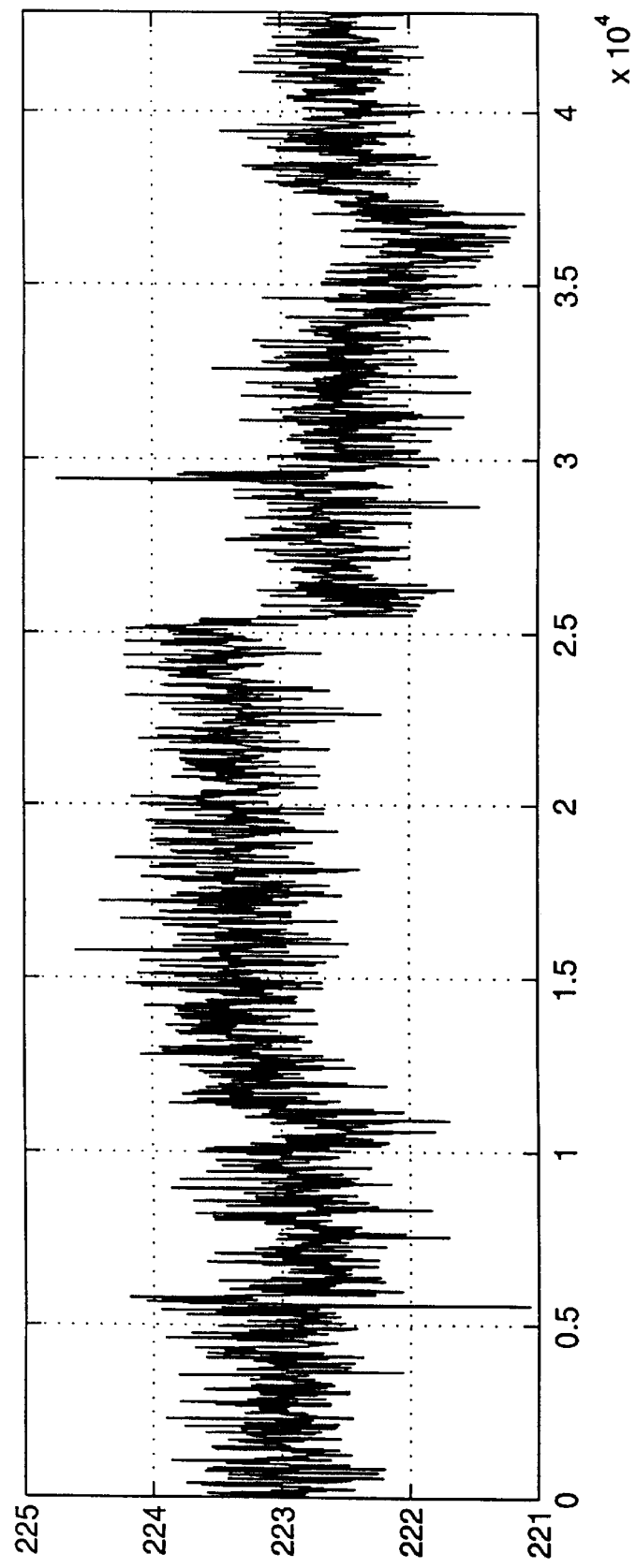
FIG. 4D illustrates a plot of SPRT decision information for the neural network estimated values.
Figure 4E:
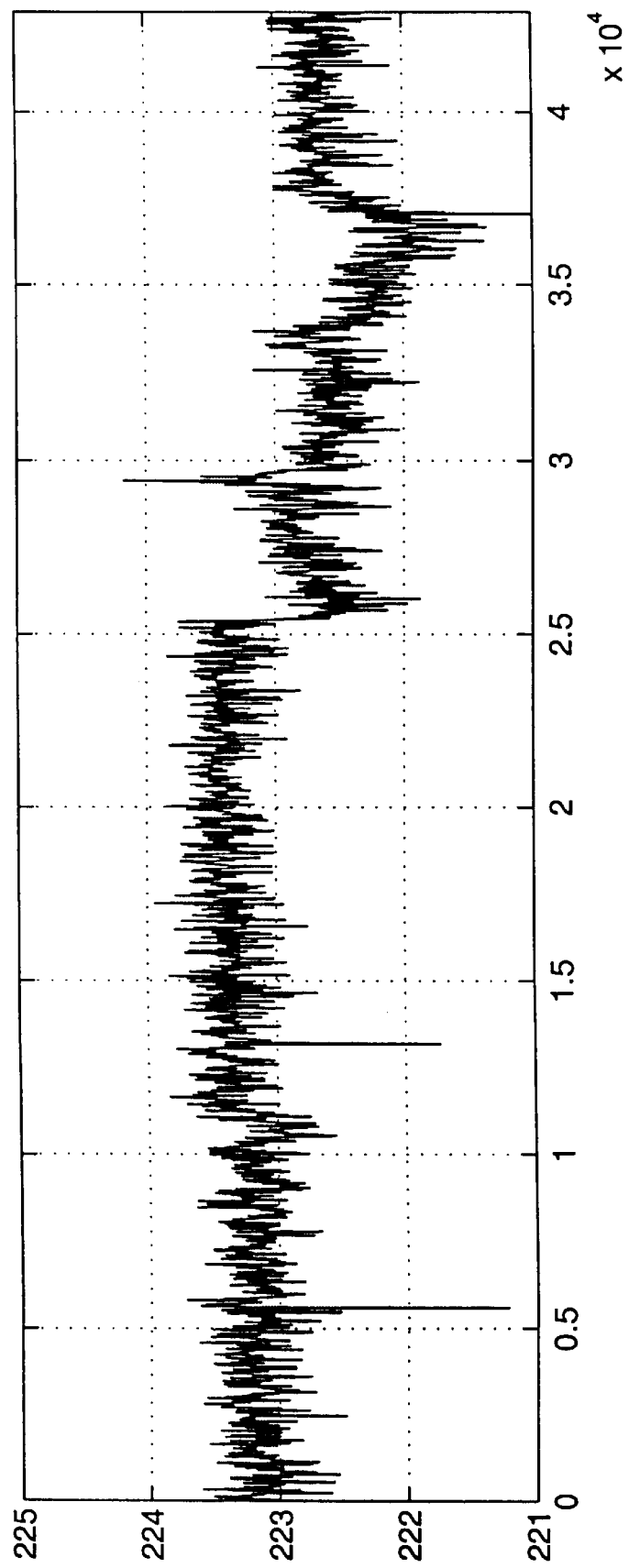
Figure 4F:
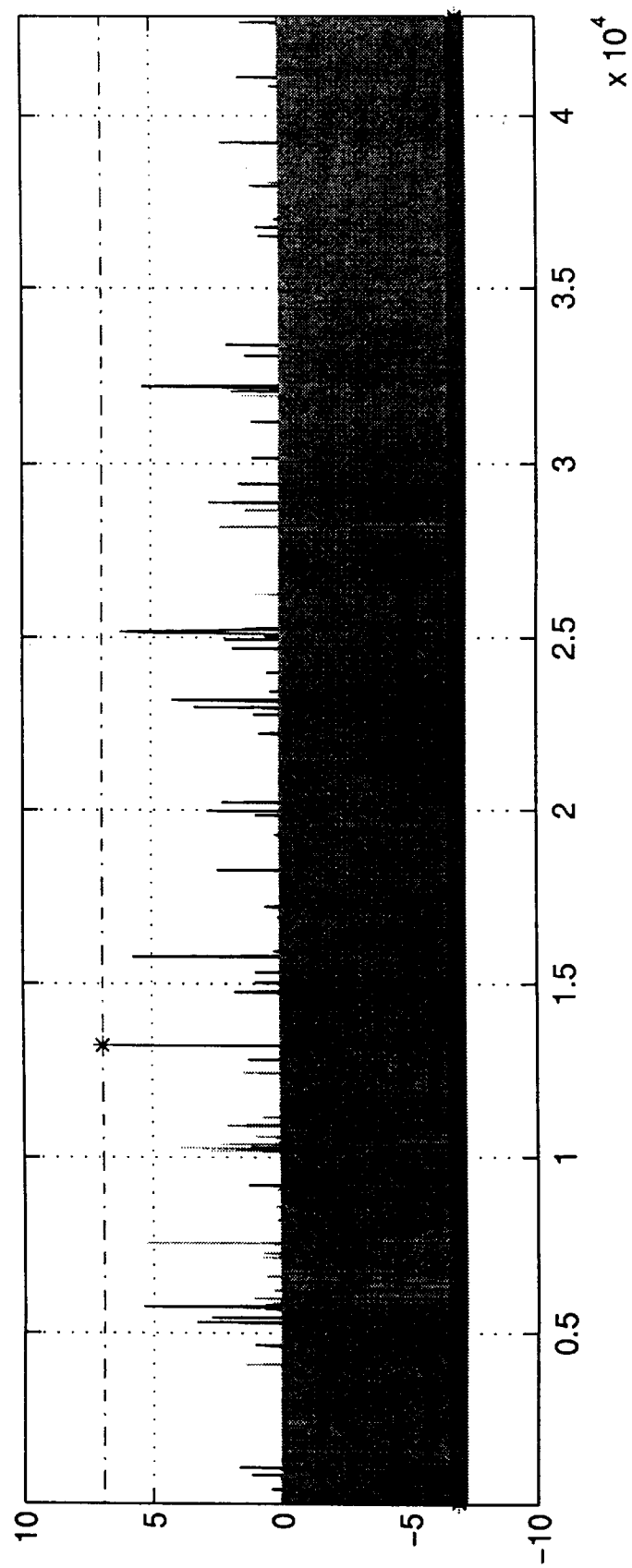

A flow diagram of the PS 50 having three example sensor inputs (L=3), is shown in FIG. 3. In the NPPR system 10, the PS 50 is shown, for example, with three inputs, referring to FIG. 3.

A series of experiments were carried out to demonstrate the effectiveness of the method of the invention. These experiments are set forth for illustrative purpose only as non-limiting Examples I and II hereinafter.

To illustrate the performance of the NPPR system 10, tests were conducted on data acquired from a nuclear reactor at the Crystal River Nuclear Power Plant (CRNPP). A conventional 25-sensor model was used. This model included a Venturi flow meter and twenty-four sensors that were found by correlation analysis to be highly correlated with the Venturi flow meter readings and among one another. Two examples are shown with Example I for the data without any modification for normal reactor operations and Example II was for data with an error introduced in one of the sensors' recording.

EXAMPLE I

In this example, th estimation methodology was implemented on normal sensor data without any modification. The data used in this test were selected from the recordings made at the end of an operating cycle of the CRNPP reactor. By doing so, any perturbation due to startup was eliminated, and the selected data are relatively stationary. A list of these sensors and some of their statistics are listed in Tables 1 and 2. For the VSET 20 (see FIG. 1), the process memory matrix D was constructed by using a conventional vector ordering methodology to conduct training on all the selected data for 42870 sampled data points. As a result, two hundred and nineteen 25×1 vectors (observations) were chosen to form the D matrix. The NN 40 (see FIG. 1) used in this test is a standard three-layer backpropagation network with twenty-five neurons in the input layer, fifteen in the hidden layer, and twenty-five in the output layer. The training for the NN 40 was conducted on the 25×219 process memory matrix D established earlier with a system error of 0.0457, the average of pattern errors of all 219 patterns. Some results of the test are shown in tables and figures following.

TABLE 1

The sensors of the Crystal River Nuclear Power Plant used for the tests of this report:

| Sensor No. | Descriptions of Sensors |
|---|---|
| 1 | 11 S287 STEAM GENERATOR A LEVEL |
| 2 | 20 S336 STEAM GENERATOR B LEVEL |
| 3 | 21 S293 STEAM GENERATOR B LEVEL |
| 4 | 26 T217 RC PUMP B2 SUCTION TEMP |
| 5 | 43 R228 RC OUTLET TEMP (NARROW) |
| 6 | 49 R229 RC OUTLET B TEMP (NARROW) |
| 7 | 52 A210 FWP A SPEED (RPM) |
| 8 | 63 A319 'B' OTSG EFIC HIGH LEVEL |
| 9 | 66 A322 'A' OTSG EFIC HIGH LEVEL |
| 10 | 204 N507 FLUX 3-L LEVEL 4 (NANOAMPS) |
| 11 | 92 R319 PUMP INLET TEMP 3B1/RCP-1C |
| 12 | 168 N379 FLUX 13-F LEVEL 4 |
| 13 | 226 R268 INCORE TEMPERATURE 5-K |
| 14 | 227 R270 INCORE TEMPERATURE 7-M |
| 15 | 228 R273 INCORE TEMPERATURE 9-M |
| 16 | 244 S302 STEAM GEN B INLET FW FLOW |
| 17 | 248 S303 STEAM GEN A INLET FW (WIDE) |
| 18 | 249 S301 STEAM GEN A INLET FLOW |
| 19 | 250 S313 STEAM GEN B INLET FWC |
| 20 | 265 S284 STEAM GENERATOR A LEVEL |
| 21 | 268 S286 STEAM GENERATOR B LEVEL |
| 22 | 269 S332 STEAM GEN OUTLET 1B TEMP |
| 23 | 270 T231 1B MAIN STFAM TO TURB TEMP |
| 24 | 273 S320 STEAM GEN OUTLET 2B TEMP |
| 25 | 274 T233 2B MAIN STEAM TO TURB TEMP |

TABLE 2

Some statistics of the normal sensor data used in the tests.

| Sensor No. | Mean | Std. | Max. | Min. | Rms |
|---|---|---|---|---|---|
| 1 | +2.23e+02 | +5.47e−01 | +2.25e+02 | +2.21e+02 | +2.23e+02 |
| 2 | +5.65e+02 | +3.42e−01 | +5.69e+02 | +5.67e+02 | +5.68e+02 |
| 3 | +8.87e+01 | +2.29e−01 | +8.94e+01 | +8.78e+01 | +5.87e+01 |
| 4 | +5.69e+02 | +3.45e−01 | +5.70e+02 | +5.68e+02 | +5.69e+02 |
| 5 | +6.12e+02 | +2.60e−01 | +6.12e+02 | +6.11e+02 | +6.12e+02 |
| 6 | +6.12e+02 | +2.53e−01 | +6.12e+02 | +6.11e+02 | +6.12e+02 |
| 7 | +4.55e+03 | +5.06e+00 | +4.57e+03 | +4.53e+03 | +4.55e+03 |
| 8 | +8.64e+01 | +3.23e−01 | +8.74e+01 | +8.51e+01 | +8.64e+01 |
| 9 | +9.09e+01 | +3.00e−01 | +9.22e+01 | +8.95e+01 | +9.09e+01 |
| 10 | +2.97e+02 | +2.04e+00 | +3.04e+02 | +2.90e+02 | +2.97e+02 |
| 11 | +5.74e+02 | +4.97e−01 | +5.76e+02 | +5.73e+02 | +5.74e+02 |
| 12 | +4.79e+02 | +2.42e+00 | +4.84e+02 | +4.72e+02 | +4.79e+02 |
| 13 | +6.22e+02 | +4.60e−01 | +6.24e+02 | +6.21e+02 | +6.22e+02 |
| 14 | +6.24e+02 | +4.79e−01 | +6.26e+02 | +6.23e+02 | +6.24e+02 |
| 15 | +6.25e+02 | +4.84e−01 | +6.27e+02 | +6.23e+02 | +6.25e+02 |
| 16 | +5.35e+03 | +1.75e+01 | +5.41e+03 | +5.29e+03 | +5.35e+03 |
| 17 | +9.66e+02 | +5.37e+00 | +9.94e+02 | +9.38e+02 | +9.66e+02 |
| 18 | +5.39e+03 | +1.52e+01 | +5.46e+03 | +5.31e+03 | +5.39e+03 |
| 19 | +9.52e+02 | +6.17e+00 | +9.73e+02 | +9.33e+02 | +9.52e+02 |
| 20 | +9.29e+01 | +2.51e−01 | +9.40e+01 | +9.09e+01 | +9.29e+01 |
| 21 | +2.89e+02 | +1.09e+00 | +2.93e+02 | +2.85e+02 | +2.89e+02 |
| 22 | +6.01e+02 | +5.17e−01 | +6.02e+02 | +6.00e+02 | +6.01e+02 |
| 23 | +5.98e+02 | +4.67e−01 | +5.99e+02 | +5.97e+02 | +5.98e+02 |
| 24 | +6.03e+02 | +3.42e−01 | +6.04e+02 | +6.01e+02 | +6.03e+02 |
| 25 | +6.02e+02 | +4.35e−01 | +6.03e+02 | +6.01e+02 | +6.02e+02 |
| Average | +1.04e+03 | +2.46e+00 | +1.05e+03 | +1.03e+03 | +1.04e+03 |

Figure 5A:
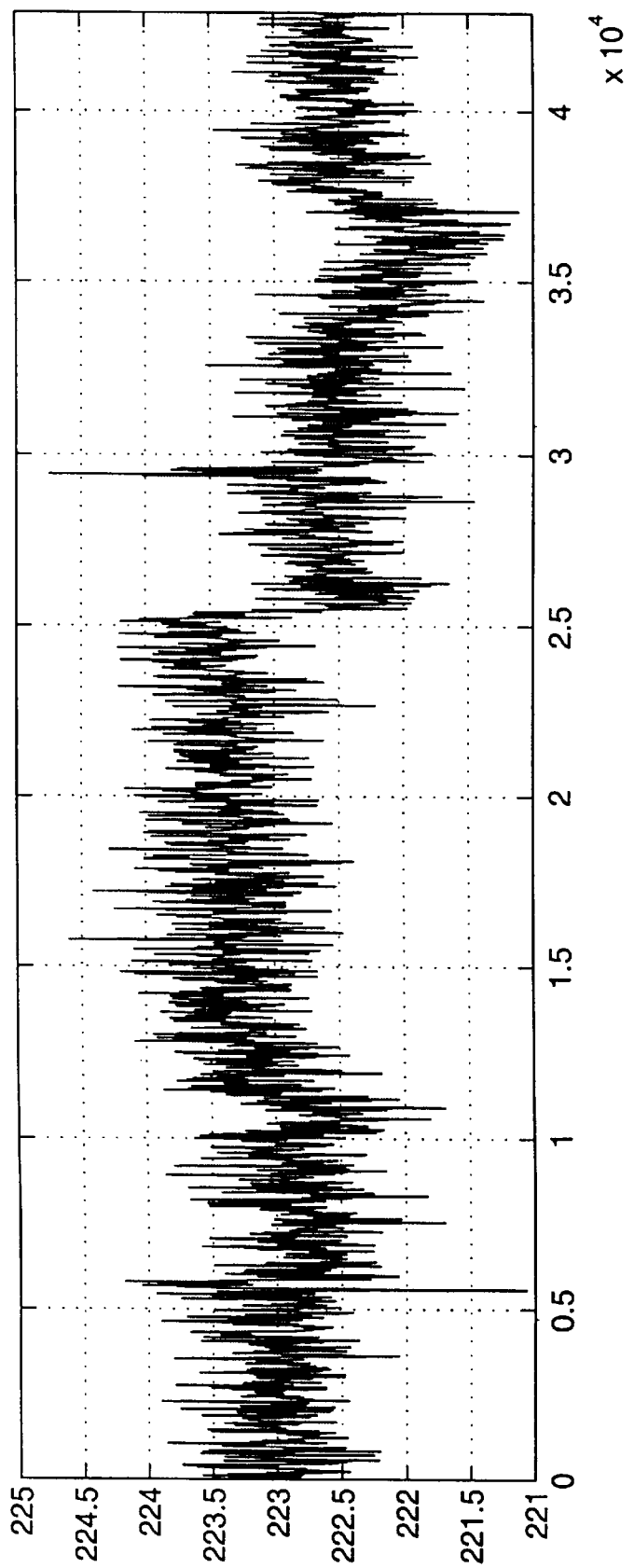
FIG. 5A(i) illustrates a plot of initial data for sensor no. 1 and FIG. 5A(ii) illustrates a parity space estimated value.
Figure 5B:
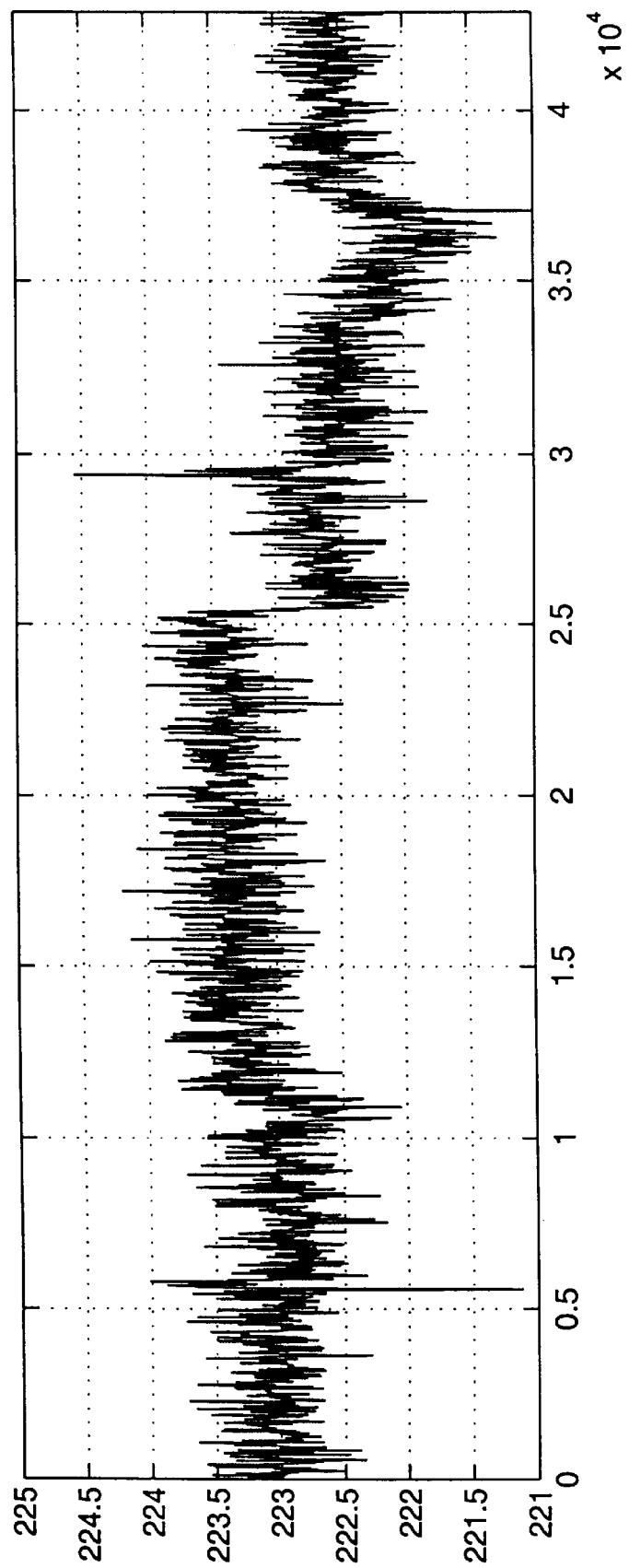
FIG. 5B illustrates a plot of parity space decision information for the data of FIG. 5A.
Figure 5C:
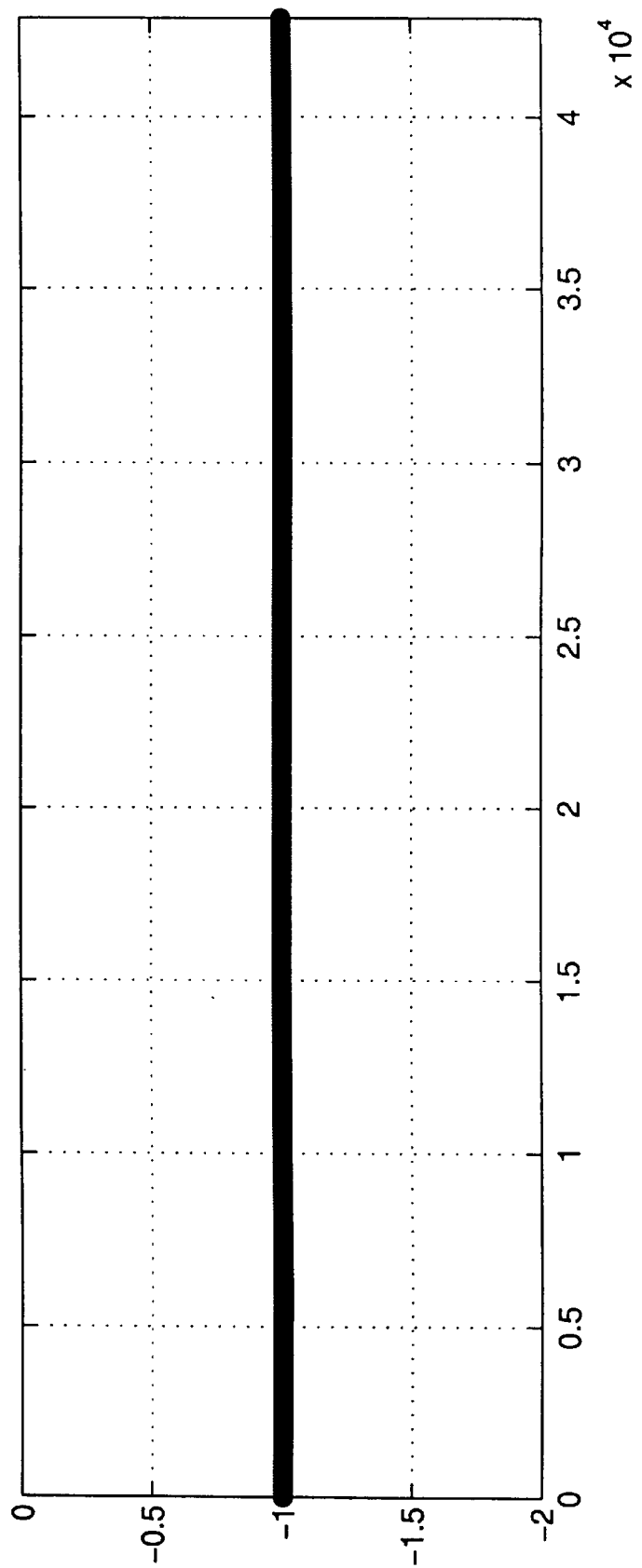
Figure 6C:
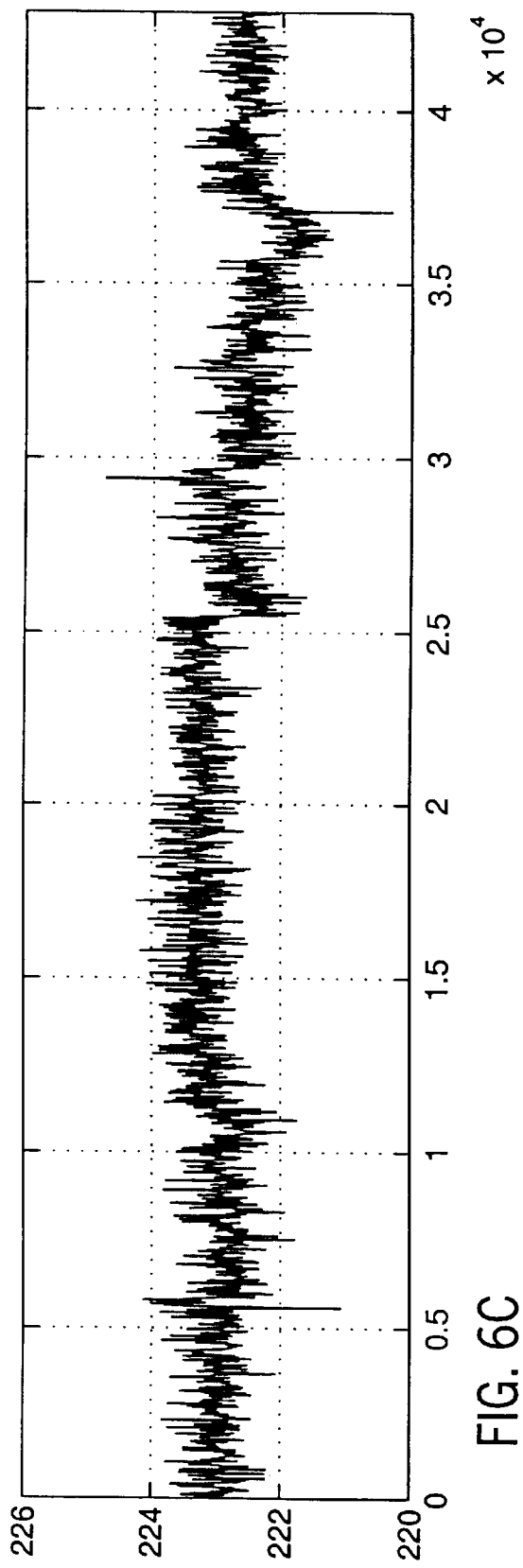
FIG. 6C(i) illustrates the normal initial data, FIG. 6C(ii) illustrates a plot of the drifted initial data, and FIG. 6C(iii) illustrates neural network estimated values.
Figure 6D:
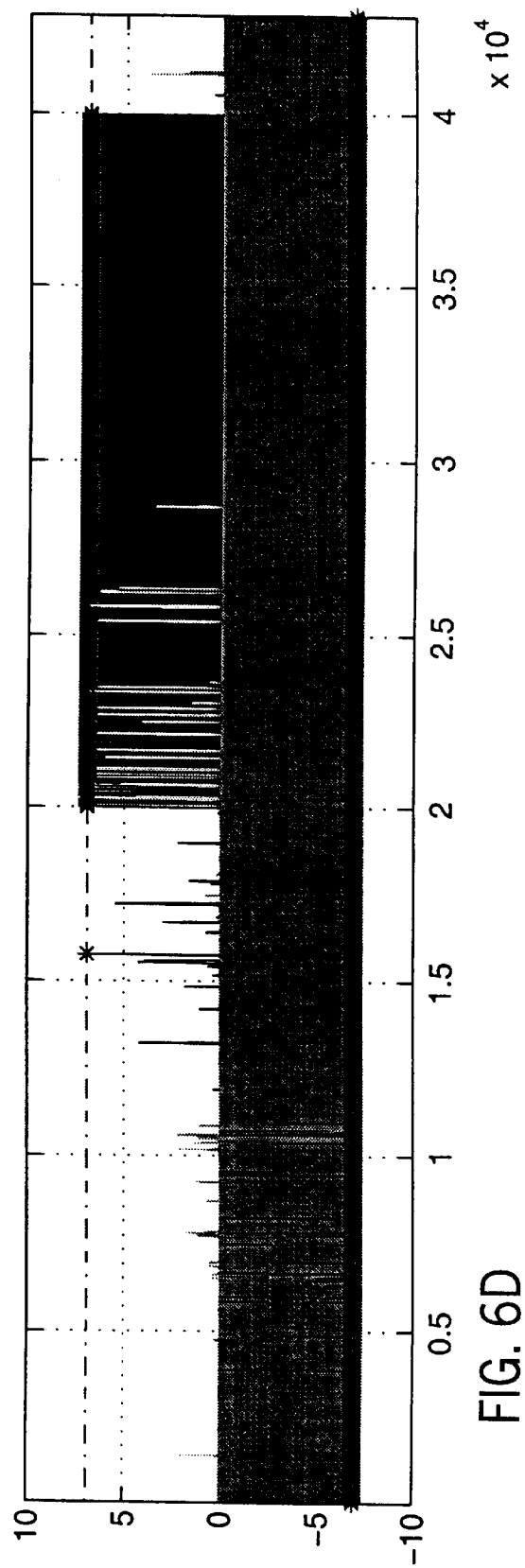
FIG. 6D illustrates a plot of SPRT decision information for neural network residual values.
Figure 6E:
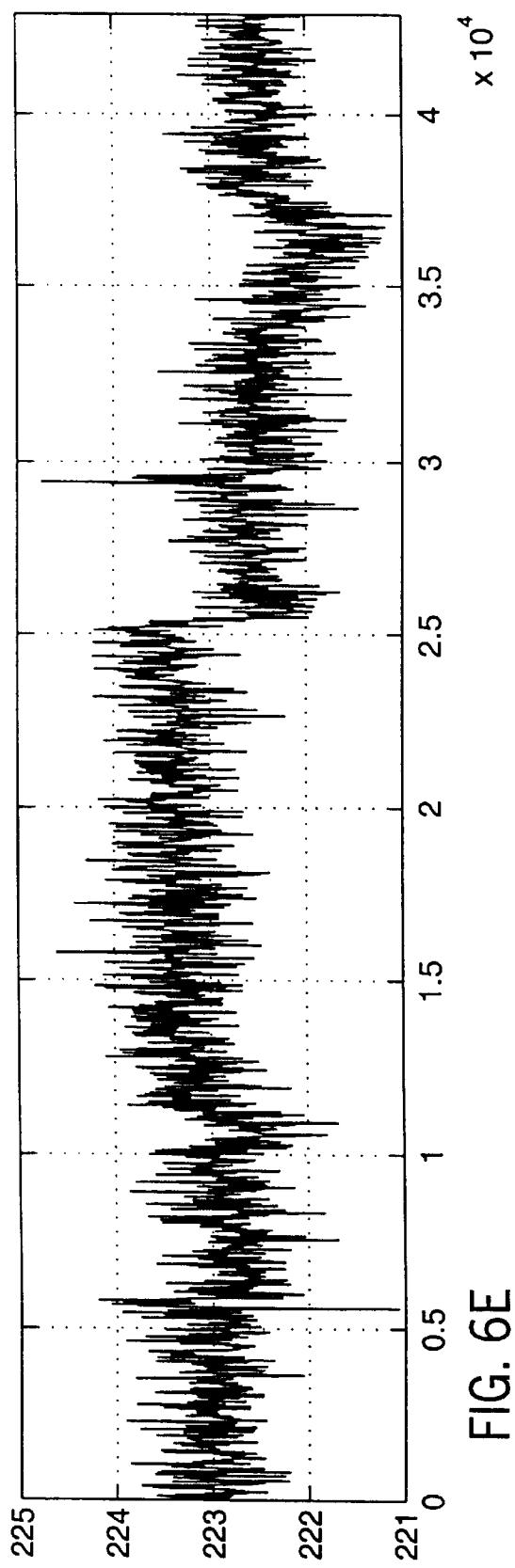
FIG. 6A(i) illustrates normal initial data, FIG. 6A(ii) illustrates a plot of a drifted initial data and FIG. 6A(iii) illustrates system state estimated data.
FIG. 6B illustrates a plot of SPRT decision information for the system state residual values.
Figure 6F:
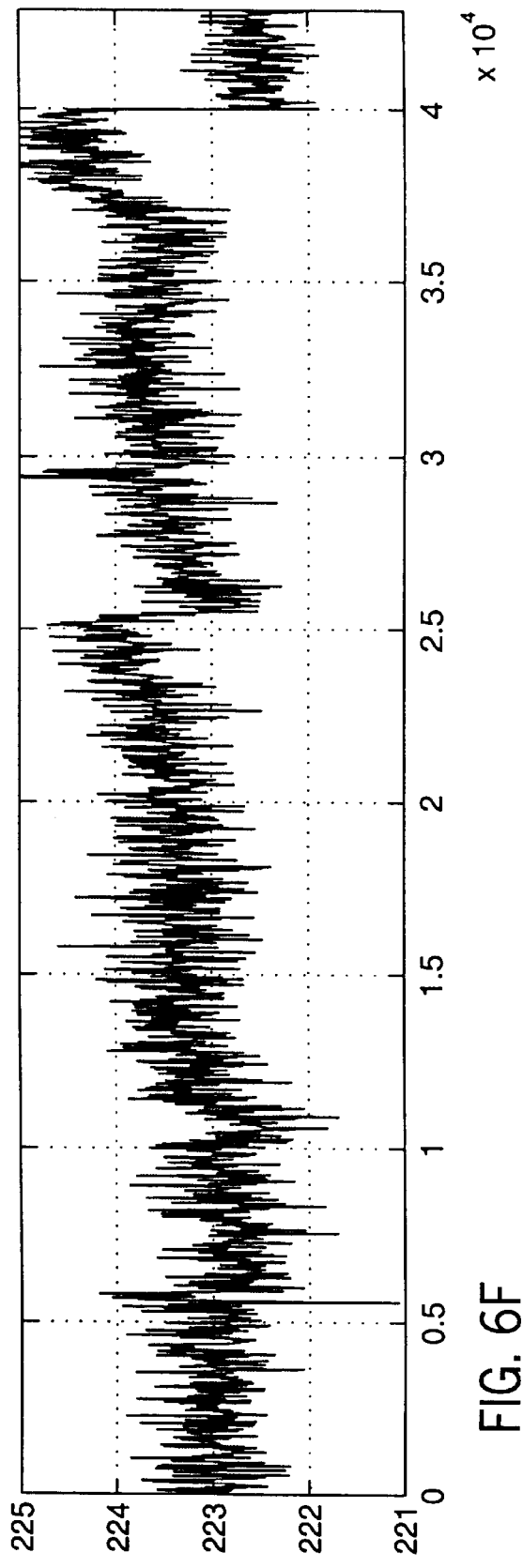
Figure 6G:
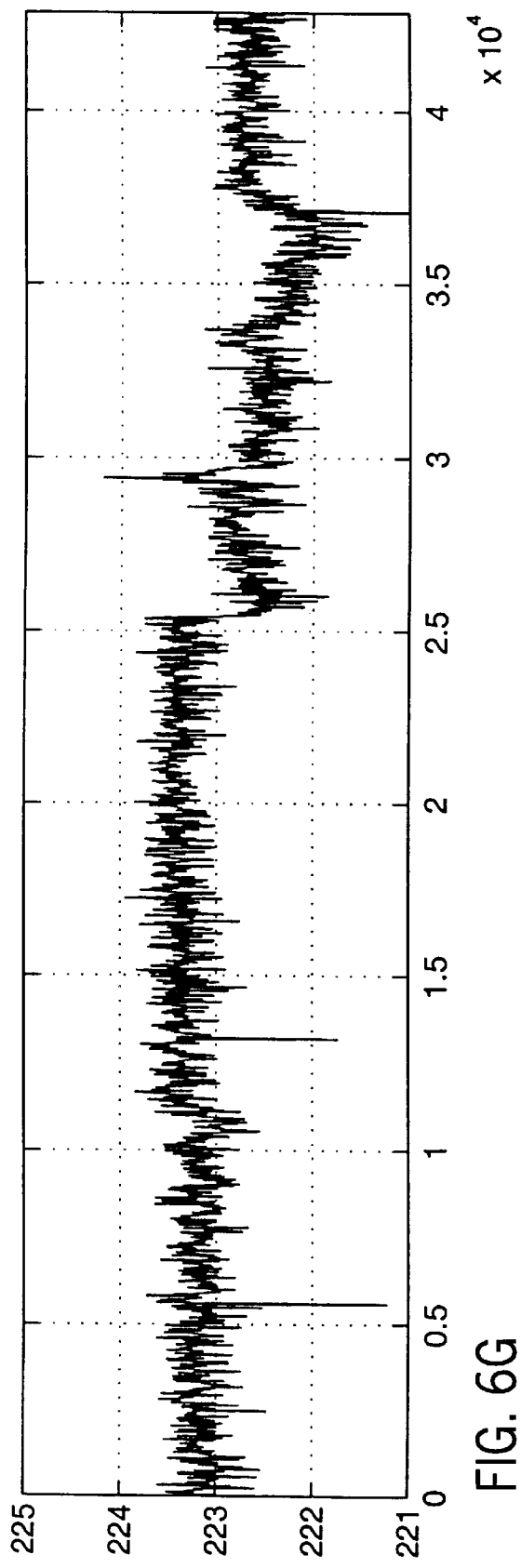
Figure 6H:
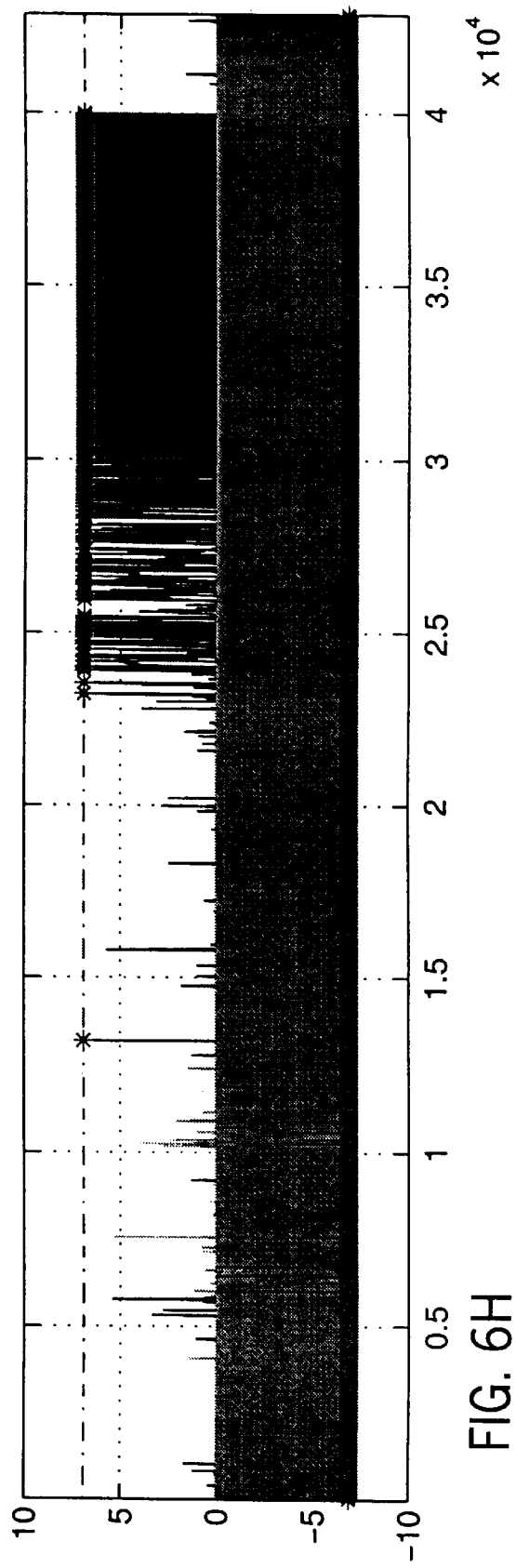

Table 3 displays the VSET estimations of the twenty-five sensor signals. Note that all the results are normalized by the root means squares (rms) or the powers of the raw sensor signals. The average power of the estimation errors is 0.0234% of the powers of the raw sensor signals, and average empirical false-alarm probabilities of the positive and negative means SPRTs are $1.15 \times 10^{-3}$ and $1.93 \times 10^{-3}$ respectively, when the specified false-alarm probability missed-alarm probability, and the sample failure magnitude are et at 0.001, 0.001, and 4, respectively. In similar formats, the results for the NN 40 and the PS 50 are presented in Tables 4 and 5. All these results indicate excellent system estimations and monitoring capability. In FIG. 4, some results of applying the VSET 20, the NN 40, and the SPRT 30 of the 1st sensor are plotted. Finally, the PS estimations and decisions are shown in FIG. 5. The decisions of the PS 50 are quantified into eight numbers, which are −1, 0, 1, 1.5, 2, 2.5, 3 and 3.5. In the above order, the numbers represent the PS decisions of no failure, no decision, sensor failed low, sensor failed high, NN failed low, NN failed high, VSET failed low, and VSET failed high, respectively.

TABLE 3

Some statistics of the VSET estimation errors from Example I (normalized by the powers of the raw sensor data). Positive_a and negative_a are the empirical false alarm probabilities of the positive and negative mean SPRTs, respectively. The specified false-alarm, missed-alarm probabilities and the sample failure magnitude are 0.001, 0.001, and 4, respectively.

| Sensor No. | MAX. | MEN. | RMS | Positive_a | Negative_a |
|---|---|---|---|---|---|
| 1 | +2.08e−03 | −1.70e−03 | +2.43e−04 | +2.10e−03 | −9.16e+04 |
| 2 | +3.93e−04 | −4.22e−04 | +9.62e−05 | +1.65e−04 | +9.76e−04 |
| 3 | +1.40e−03 | −1.31e−03 | +2.86e−04 | +6.34e−04 | +6.31e−04 |
| 4 | +3.06e−04 | −2.69e−04 | +6.88e−05 | +3.98e−04 | +1.99e−04 |
| 5 | +3.44e−04 | −2.89e−04 | +7.31e−05 | +1.04e−03 | +2.30e−04 |
| 6 | +2.70e−04 | −3.08e−04 | +6.91e−05 | +4.90e−04 | +1.31e−04 |
| 7 | +9.01e−04 | −9.07e−04 | +1.79e−04 | +7.23e−04 | +1.15e−03 |
| 8 | +1.87e−03 | −2.89e−03 | +2.95e−04 | +3.28e−04 | +9.14e−04 |
| 9 | +1.65e−03 | −2.36e−03 | +2.59e−04 | +1.01e−03 | +1.21e−03 |
| 10 | +1.07e−02 | −1.13e−02 | +5.16e−04 | +3.31e−03 | +1.08e−02 |
| 11 | +8.34e−04 | −1.05e−03 | +1.71e−04 | +7.17e−04 | +1.90e−03 |
| 12 | +3.18e−03 | −3.89e−03 | +3.56e−04 | +3.35e−03 | +5.94e−03 |
| 13 | +8.57e−04 | −8.29e−04 | +1.60e−04 | +5.31e−04 | +7.64e−04 |
| 14 | +1.05e−03 | −8.44e−04 | +1.69e−04 | +3.64e−04 | +4.33e−04 |
| 15 | +7.39e−04 | −9.26e−04 | +1.63e−04 | +7.28e−04 | +3.98e−04 |
| 16 | +1.47e−03 | −1.86e−03 | +3.10e−04 | +9.85e−04 | +1.38e−03 |
| 17 | +4.21e−03 | −3.58e−03 | +4.67e−04 | +1.78e−03 | +5.25e−04 |
| 18 | +3.42e−03 | −1.54e−03 | +2.78e−04 | +1.06e−03 | +1.67e−03 |
| 19 | +2.71e−03 | −2.01e−03 | +4.22e−04 | +9.55e−04 | +7.32e−04 |
| 20 | +1.37e−03 | −1.66e−02 | +3.71e−04 | +1.59e−04 | +6.62e−04 |
| 21 | +2.91e−03 | −1.67e−03 | +3.82e−04 | +9.82e−04 | +5.21e−04 |
| 22 | +1.07e−03 | −5.46e−04 | +1.30e−04 | +2.17e−03 | +1.33e−04 |
| 23 | +6.08e−04 | −5.67e−.04 | +1.18e−04 | +1.55e−03 | +7.15e−04 |
| 24 | +6.98e−04 | −1.14e−03 | +1.39e−04 | +4.83e−04 | +1.45e−02 |
| 25 | +8.10e−04 | −5.47e−04 | +1.23e−04 | +2.73e−03 | +8.19e−04 |
| Average | +1.83e−03 | −2.37e−03 | +2.34e−04 | +1.15e−03 | +1.93e−03 |

TABLE 4

Some statistics of the NN estimation errors from Example I (normalized by the powers of the raw sensor data). Positive_a and negative_a are the empirical false alarm probabilities of the positive and negative mean SPRTs, respectively. The specified false-alarm, missed-alarm probabilities and the sample failure magnitude are 0.001, 0.001, and 4, respectively.

| Sensor No. | MAX. | MIN. | RMS | Positive_a | Negative_a |
|---|---|---|---|---|---|
| 1 | +9.79e−03 | −6.18e−03 | +1.57e−03 | +8.58e−04 | +2.32e−04 |
| 2 | +1.04e−03 | −9.31e−04 | +1.91e−04 | +4.69e−03 | +2.84e−03 |
| 3 | +7.47e−03 | −4.93e−03 | +9.81e−04 | +1.46e−03 | +1.01e−03 |
| 4 | +8.85e−04 | −1.28e−03 | +2.05e−04 | +1.29e−03 | +3.39e−03 |
| 5 | +5.05e−04 | −5.53e−04 | +1.10e−04 | +1.71e−03 | +1.80e−03 |
| 6 | +5.87e−04 | −5.59e−04 | +1.31e−04 | +1.80e−03 | +7.10e−04 |
| 7 | +4.09e−03 | −4.67e−03 | +7.94e−04 | +2.89e−04 | +4.62e−03 |
| 8 | +8.69e−04 | −7.16e−03 | +1.92e−03 | +6.46e−04 | +1.30e−04 |
| 9 | +9.04e−03 | −1.27e−02 | +2.42e−03 | +7.14e−04 | +8.41e−04 |
| 10 | +1.58e−02 | −1.36e−02 | +3.18e−03 | +1.34e−03 | +5.13e−04 |
| 11 | +1.89e−03 | −1.62e−03 | +4.69e−04 | +5.21e−04 | +1.97e−04 |
| 12 | +7.44e−03 | −7.86e−03 | +2.31e−03 | +2.58e−04 | +1.93e−04 |
| 13 | +1.59e−03 | −1.81e−03 | +3.91e−04 | +3.31e−04 | +1.29e−03 |
| 14 | +1.95e−03 | −1.95e−03 | +4.46e−04 | +3.27e−04 | +2.29e−04 |
| 15 | +1.52e−03 | −1.58e−03 | +3.51e−04 | +8.57e−04 | +2.31e−04 |
| 16 | +7.16e−03 | −7.46e−03 | +1.31e−03 | +1.80e−03 | +1.69e−03 |
| 17 | +1.39e−02 | −1.89e−02 | +2.92e−03 | +1.88e−03 | +3.60e−03 |
| 18 | +1.13e−02 | −5.38e−03 | +1.45e−03 | +2.25e−03 | +1.64e−04 |
| 19 | +1.50e−02 | −1.46e−02 | +2.64e−03 | +7.53e−04 | +4.59e−04 |
| 20 | +8.30e−03 | −1.99e−02 | +1.56e−03 | +3.49e−04 | +9.05e−04 |
| 21 | +6.69e−03 | −8.74e−03 | +1.98e−03 | +2.91e−04 | +4.12e−03 |
| 22 | +1.30e−03 | −1.47e−03 | +2.16e−04 | +6.77e−03 | +4.56e−04 |
| 23 | +9.95e−03 | −1.66e−03 | +2.46e−04 | +1.29e−03 | +5.00e−03 |
| 24 | +8.58e−04 | −1.50e−03 | +2.19e−04 | +2.89e−04 | +3.56e−03 |
| 25 | +7.71e−04 | −1.37e−03 | +1.83e−04 | +1.61e−03 | +5.22e−04 |
| Average | +5.54e−03 | −5.94e−03 | +1.13e−03 | +1.45e−03 | +1.55e−03 |

TABLE 5

Some statistics of the PS algorithm estimation errors from
Example 1 (normalized by the powers of the raw sensor data).
F. A. P. is the empirical false-alarm probabilities for the
PS decisions.

| Sensor No. | MAX. | MIN. | RMS | F. A. P. |
|---|---|---|---|---|
| 1 | +3.09e−03 | −2.32e−03 | −5.63e+04 | +2.33e−05 |
| 2 | +3.61e−04 | −3.23e−04 | +8.31e−05 | +6.30e−04 |
| 3 | +1.82e−03 | −1.49e−03 | +3.45e−04 | +2.33e−04 |
| 4 | +2.79e−04 | −3.04e−04 | +7.63e−05 | +7.46e−04 |
| 5 | +2.30e−04 | −2.39e−04 | +5.27e−05 | +0.00e+00 |
| 6 | +2.60e−04 | −2.56e−04 | +5.63e−05 | +0.00e+00 |
| 7 | +1.09e−03 | −1.06e−03 | +2.87e−04 | +1.59e−03 |
| 8 | +3.09e−03 | −2.79e−03 | +6.95e−04 | +0.00e+00 |
| 9 | +3.51e−03 | −5.02e−03 | +8.38e−04 | +0.00e+00 |
| 10 | +7.80e−03 | −7.21e−03 | +1.13e−03 | +2.33e−05 |
| 11 | +7.95e−04 | −9.58e−−04 | +1.98e−04 | +7.00e−05 |
| 12 | +2.66e−03 | −3.03e−03 | +8.20e−04 | +0.00e+00 |
| 13 | +8.09e−04 | −8.29e−04 | +1.68e−04 | +2.80e−04 |
| 14 | +1.05e−03 | −8.44e−04 | +1.86e−04 | +1.40e−04 |
| 15 | +6.34e−04 | −9.26e−04 | +1.53e−04 | +7.00e−05 |
| 16 | +1.63e−03 | −1.93e−03 | +4.64e−04 | +9.33e−04 |
| 17 | +3.64e−03 | −3.62e−03 | +9.95e−04 | +1.52e−03 |
| 18 | +3.00e−03 | −1.79e−03 | +4.86e−04 | +1.87e−03 |
| 19 | +3.82e−03 | −3.88e−03 | +9.42e−04 | +1.87e−04 |
| 20 | +2.12e−03 | −1.82e−02 | +5.94e−04 | +3.50e−04 |
| 21 | +2.49e−03 | −2.67e−03 | +7.14e−04 | +1.63e−04 |
| 22 | +5.78e−04 | −3.41e−04 | +9.65e−05 | +2.33e−05 |
| 23 | +4.01e−04 | −5.61e−04 | +1.05e−04 | +2.33e−05 |
| 24 | +3.85e−04 | −5.66e−04 | +9.65e−05 | +3.97e−04 |
| 25 | +4.69e−04 | −3.94e−04 | +8.27e−05 | +2.33e−05 |
| Average | +1.84e−03 | −2.46e−03 | +4.09e−04 | +3.71e−04 |

EXAMPLE II

The main purpose of this test example is to verify the ability of the NPPR system 10 to detect possible failure(s) or, in general, deviations from a particular state in the monitored system 60 and to estimate the true values of sensor measurements when there is sensor failure(s) or data deviations. In the test, the same sensor data, the D matrix, and all the parameters for SPRT and PS calculations of Example I were used, except that the data of the 1st sensor were perturbed by addition of a positive drift, which was introduced from the 20001st to 40000th data point and increased gradually from zero to five standard deviations of the normal sensor data. The resulting data are shown in Table 6.

In Table 6, some statistics of the VSET estimation errors and the empirical false-alarm probabilities of its SPRTs are listed. In the same fashion, some results of the NN 40 and the PS 50 from this example are displayed in Tables 7 and 8. By comparing Tables 6 and 3, we can find that in spite of the failure of the first sensor, both the empirical false-alarm probabilities and the powers of the estimation errors of the other 24 sensors did not change significantly. Similar observations can be made for the NN 40 and the PS 50 by comparing their results from Example I and II. This phenomenon demonstrates that the estimation techniques of the NPPR system 10 have excellent fault-tolerant capability.

TABLE 6

Some statistics of the VSET estimation errors from Example II
(normalized by the powers of the raw sensor data).
Positive_a and negative_a are the empirical false
alarm probabilities of the positive and negative mean SPRTs,
respectively. The specified false-alarm, missed-alarm
probabilities and the sample failure magnitude
are 0.001, 0.001, and 4, respectively.

| Sensor No. | MAX. | MIN. | RMS | Positive_a | Negative_a |
|---|---|---|---|---|---|
| 1 | +1.54e−02 | −4.10e−03 | +4.77e−04 | +5.28e−01 | +4.74e−03 |
| 2 | +4.03e−04 | −4.36e−04 | +9.61e−05 | +2.33e−04 | +9.99e−04 |
| 3 | +1.40e−03 | −1.31e−03 | +2.80e−04 | +5.95e−04 | +5.29e−04 |
| 4 | +3.03e−04 | −2.69e−04 | +6.88e−05 | +4.67e−04 | +2.64e−04 |
| 5 | +3.44e−04 | −2.83e−04 | +7.30e−05 | +1.17e−03 | +2.62e−04 |
| 6 | +2.77e−04 | −3.08e−04 | +6.86e−05 | +3.92e−04 | +9.86e−05 |
| 7 | +9.20e−04 | −9.69e−04 | +1.74e−04 | +5.91e−04 | +9.07e−04 |
| 8 | +1.79e−03 | −2.89e−03 | +2.84e−04 | +2.61e−04 | +8.39e−04 |
| 9 | +1.56e−03 | −2.24e−03 | +2.51e−04 | +9.06e−04 | +8.81e−04 |
| 10 | +1.07e−02 | −1.12e−02 | +5.06e−04 | +3.27e−03 | +1.08e−02 |
| 11 | +8.34e−04 | −9.58e−04 | +1.65e−04 | +6.83e−04 | +1.78e−03 |
| 12 | +3.18e−03 | −3.89e−03 | +3.49e−04 | +3.34e−03 | +5.68e−03 |
| 13 | +8.57e−04 | −8.07e−04 | +1.57e−04 | +3.97e−04 | +6.28e−04 |
| 14 | +1.05e−03 | −7.94e−04 | +1.66e−04 | +3.28e−04 | +4.00e−04 |
| 15 | +7.39e−04 | −9.39e−04 | +1.60e−04 | +6.96e−04 | +3.28e−04 |
| 16 | +1.48e−03 | −1.86e−03 | +3.09e−04 | +1.05e−03 | +1.28e−03 |
| 17 | +4.21e−03 | −3.58e−03 | +4.52e−04 | +1.21e−03 | +4.90e−04 |
| 18 | +3.42e−03 | −1.55e−03 | +2.78e−04 | +9.61e−04 | +1.57e−03 |
| 19 | +2.71e−03 | −2.01e−03 | +4.14e−04 | +7.63e−04 | +4.91e−04 |
| 20 | +1.37e−03 | −1.66e−02 | +3.66e−04 | +1.26e−04 | +6.65e−04 |
| 21 | +3.09e−03 | −1.67e−03 | +3.67e−04 | +1.00e−03 | +4.84e−04 |
| 22 | +1.04e−03 | −5.46e−04 | +1.29e−04 | +1.90e−04 | +1.99e−04 |
| 23 | +5.94e−04 | −5.67e−04 | +1.16e−04 | +1.03e−03 | +4.89e−04 |
| 24 | +6.26e−04 | −1.14e−03 | +1.33e−04 | +3.22e−04 | +1.37e−02 |
| 25 | +8.25e−04 | −5.28e−04 | +1.22e−04 | +2.81e−03 | +6.52e−04 |
| Average | +2.36e−03 | −2.46e−03 | +4.10e−04 | +2.21e−02 | +1.96e−03 |

TABLE 7

Some statistics of the NN estimation errors from Example II
(normalized by the powers of the raw sensor data).
Positive_a and negative_a are the empirical false alarm
probabilities of the positive and negative mean SPRTs,
respectively. The specified false-alarm, missed-alarm probabilities
and the sample failure magnitude are
0.001, 0.091, and 4, respectively.

| Sensor No. | MAX. | MIN. | RMS | Positive_a | Negative_a |
|---|---|---|---|---|---|
| 1 | +1.52e−02 | −6.18e−03 | +4.82e−03 | +4.03e−01 | +1.43e−04 |
| 2 | +8.74e−04 | −1.01e−03 | +1.90e−04 | +1.36e−03 | +3.85e−04 |
| 3 | +7.47e−03 | −1.67e−03 | +1.03e−03 | +2.45e−03 | +7.81e−04 |
| 4 | +8.85e−04 | −1.28e−03 | +2.10e−04 | +5.98e−04 | +4.71e−03 |
| 5 | +3.82e−04 | −5.56e−04 | +1.25e−04 | +2.95e−05 | +1.43e−02 |
| 6 | +5.64e−04 | −6.63e−04 | +1.40e−04 | +5.45e−04 | +6.84e−03 |
| 7 | +4.09e−03 | −4.55e−03 | +7.99e−04 | +6.28e−04 | +3.41e−03 |
| 8 | +9.02e−03 | −7.16e−03 | +1.95e−03 | +1.16e−03 | +9.24e−05 |
| 9 | +1.19e−02 | −1.15e−02 | +2.67e−03 | +1.05e−02 | +3.82e−04 |
| 10 | +1.58e−02 | −1.16e−02 | +3.07e−03 | +3.16e−03 | +1.77e−04 |
| 11 | +1.89e−03 | −1.97e−03 | +5.38e−04 | +2.44e−04 | +2.25e−03 |
| 12 | +6.26e−03 | −9.37e−03 | +2.77e−03 | +8.90e−05 | +3.16e−03 |
| 13 | +1.68e−03 | −1.74e−03 | +3.88e−04 | +5.86e−04 | +4.46e−04 |
| 14 | +1.95e−03 | −2.21e−03 | +4.58e−04 | +2.84e−04 | +1.37e−03 |
| 15 | +1.21e−03 | −1.89e−03 | +4.18e−04 | +1.49e−04 | +5.83e−03 |
| 16 | +7.16e−03 | −5.70e−03 | +1.26e−04 | +1.51e−03 | +7.90e−04 |
| 17 | +1.36e−02 | −2.06e−02 | +3.13e−03 | +1.33e−03 | +7.79e−03 |
| 18 | +1.13e−02 | −5.38e−03 | +1.79e−03 | +7.95e−02 | +1.20e−04 |
| 19 | +1.50e−02 | −1.08e−02 | +3.32e−03 | +1.79e−02 | +3.05e−04 |
| 20 | +6.25e−03 | −1.99e−02 | +1.50e−03 | +1.73e−03 | +6.71e−04 |
| 21 | +7.81e−03 | −8.74e−03 | +2.05e−03 | +3.26e−03 | +2.54e−03 |
| 22 | +1.13e−03 | −1.47e−02 | +2.31e−04 | +2.51e−03 | +2.08e−03 |
| 23 | +9.95e−04 | −1.66e−03 | +2.41e−04 | +0.00e−00 | +5.74e−03 |
| 24 | +7.81e−04 | −1.50e−03 | +2.81e−04 | +5.62e−05 | +5.18e−02 |
| 25 | +6.21e−04 | −1.49e−03 | +2.21e−04 | +2.37e−04 | +1.39e−02 |
| Average | +5.75e−03 | −5.78e−03 | +1.34e−03 | +2.13e−02 | +5.34e−03 |

TABLE 8

Some statistics of the PS algorithm estimation errors from
Example II (normalized by the powers of the raw sensor data).
F. A. P. is the empirical false-alarm probability for the PS decisions.

| Sensor No. | MAX. | MIN. | RMS | F. A. P. |
| --- | --- | --- | --- | --- |
| 1 | +1.51e−02 | +2.74e−03 | +4.13e−03 | +8.50e−02 |
| 2 | +3.47e−04 | −3.23e−04 | +8.34e−05 | +1.87e−04 |
| 3 | +1.82e−03 | −1.49e−03 | +3.57e−04 | +2.57e−04 |
| 4 | +2.87e−04 | −3.04e−04 | +7.85e−05 | +5.60e−04 |
| 5 | +2.14e−04 | −2.39e−04 | +5.65e−05 | +0.00e−00 |
| 6 | +2.34e−04 | −2.56e−04 | +5.93e−05 | +0.00e−00 |
| 7 | +1.09e−03 | −1.03e−03 | +2.89e−04 | +9.33e−04 |
| 8 | +3.17e−03 | −2.79e−03 | +7.02e−04 | +0.00e−00 |
| 9 | +3.89e−03 | −4.57e−03 | +9.14e−04 | +0.00e−00 |
| 10 | +7.80e−03 | −6.13e−03 | +1.09e−03 | +2.33e−05 |
| 11 | +7.95e−04 | −9.58e−04 | +2.08e−04 | +0.00e−00 |
| 12 | +2.66e−03 | −3.27e−03 | +9.64e−04 | +9.33e−05 |
| 13 | +8.09e−04 | −8.07e−04 | +1.67e−04 | +1.17e−04 |
| 14 | +1.05e−03 | −7.94e−04 | +1.88e−04 | +3.03e−04 |
| 15 | +6.34e−04 | −9.39e−04 | +1.68e−04 | +2.10e−04 |
| 16 | +1.69e−03 | −1.73e−03 | +4.48e−04 | +5.83e−04 |
| 17 | +3.72e−03 | −3.66e−03 | +1.04.e−03 | +3.80e−03 |
| 18 | +3.00e−03 | −1.64e−03 | +5.50e−04 | +1.96e−02 |
| 19 | +3.83e−03 | −3.88e−03 | +1.15e−03 | +7.23e−04 |
| 20 | +2.12e−03 | −1.82e−02 | +5.79e−04 | +3.03e−04 |
| 21 | +2.63e−03 | −2.67e−03 | +7.35e−04 | +2.10e−04 |
| 22 | +5.49e−04 | −3.60e−04 | +1.00e−04 | +2.33e−05 |
| 23 | +4.01e−04 | −5.61e−04 | +1.03e−04 | +2.33e−05 |
| 24 | +3.49e−04 | −9.05e−04 | +1.13e−04 | +3.97e−04 |
| 25 | +4.04e−04 | −3.87e−04 | +9.33e−05 | +2.33e−05 |
| Average | +2.34e−03 | −2.43e−03 | +5.75e−04 | +4.53e−03 |

Figure 7C:
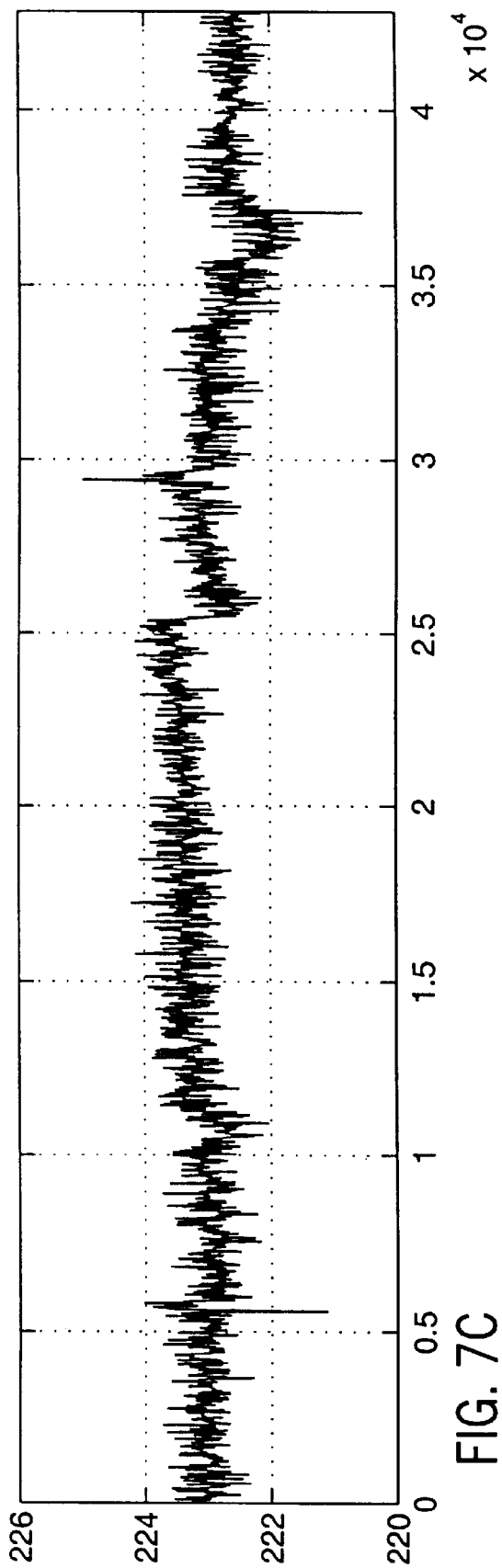
FIG. 7A(i) illustrates a plot of normal initial data, FIG. 7A(ii) illustrates drifted initial data and FIG. 7A(iii) illustrates parity space estimated values.
FIG. 7B illustrates a plot of parity space decision information.
Figure 7D:
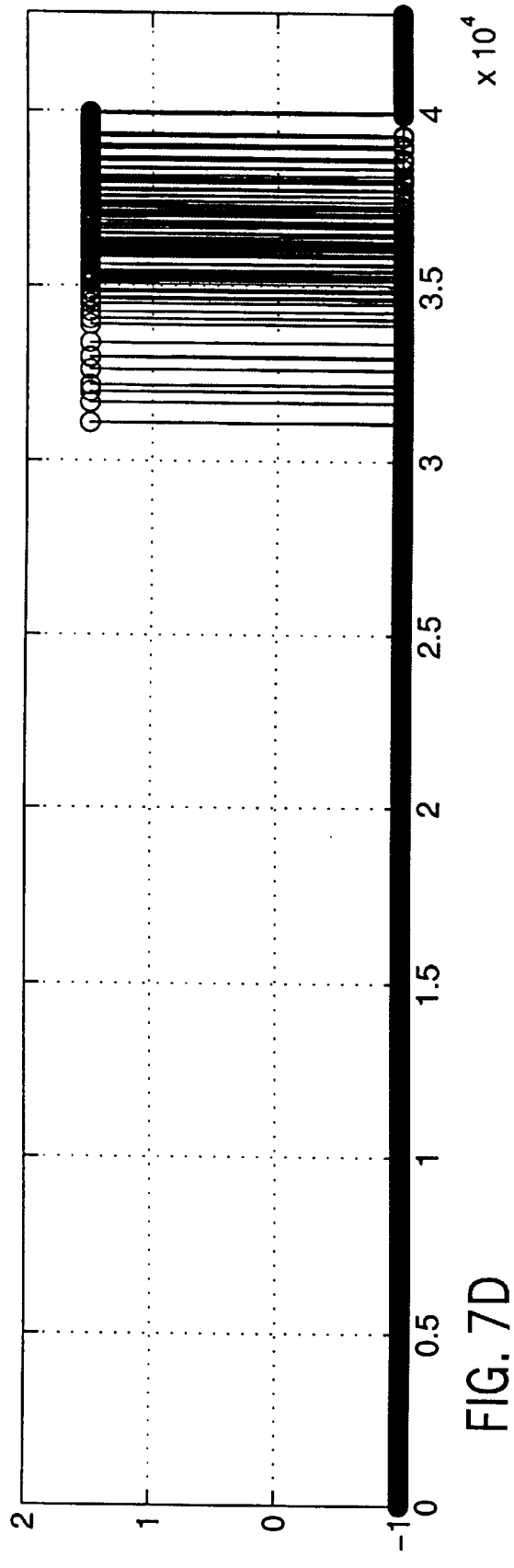

FIG. 6 includes plots of the VSET 20 and the NN 40 estimations and their SPRTs 30 from Example II for sensor #1, to which a failure (a positive drift) was introduced. In FIG. 7, the PS 50 estimations and decisions are shown for this Example 2. According to these figures, the MSET technique of this preferred embodiment detected the failure in the 1st sensor earliest, almost right after the drift was introduced. The SPRTs 30 for the NN 40 identified the failure at about 23000th data point, 3000 data points after the failure was introduced. Finally, for the PS 50 the failure was not detected until approximately the 31000th data point, 11000th data points after its introduction. Therefore, the VSET operator 20 of the MSET technique is most sensitive to failure(s), the NN 40 is next, while the PS 50 is last. Note that this order is not absolute because we can increase the sensitivity of the PS 50, for example, by expanding the bounds of sensor measurements for normal system operations, referring to equation (25). However, the tradeoff is the increase of the false-alarm probability for the PS based decisions.

The results from both these Examples I and II demonstrate that the NPPR system 10 monitors normal sensor measurements successfully (with very low false-alarm rates) but also can detect the onset of degradation of sensor(s) at a very early stage, due to the high sensitivity of SPRT 30. Moreover, among the three major techniques forming the NPPR system 10, the MSET technique performs best when the masking technique is applied, after the introduction of failure into one of the sensors, as done in Example II.

These and other objects, features and advantages of the invention will be apparent from the following description of the preferred embodiments and examples, taken in conjunction with the accompanying drawings described below.

What is claimed is:

1. A method of monitoring a process and a data source and determining their condition, comprising the steps of:

collecting initial data from a data source characteristic of a process;

producing a first set of virtual data including the step of applying a system state analyzation to the initial data from the data source;

producing a second set of virtual data including the step of applying a neural network analyzation to the initial data from the data source;

analyzing the first and second set of virtual data and also the initial data to provide a decision about at least one of the condition of the process and condition of the data source; and using a computer to perform a parity space analyzation of the first and second set of virtual data and also of the initial data to provide a parity space decision information set about at least one of the condition of the process being monitored and the condition of the data source, thereby determining whether at least one of the process and the data source is deviating from a particular state.

2. The method as defined n claim 1 further including the step of performing a sequential probability ratio test on the first set of virtual data to produce system state sequential probability ratio test decision information.

3. The method as defined in claim 1 further including the step of performing a logic test on the first set of virtual data and the second set of virtual data to produce a system state decision.

4. The method as defined in claim 1 wherein the step of producing a first set of virtual data comprises performing a vector similarity evaluation analyzation.

5. The method as defined in claim 4 wherein the step of producing the first set of virtual data further includes the step of performing a sequential probability ratio test.

6. The method s defined in claim 5 further including the step of performing a logic test on the parity space decision information set to produce a system state decision about status of the process.

7. The method as defined in claim 1 wherein the process is selected from the group consisting of an industrial, chemical, nuclear, biological, vehicular, financial, avionics and nautical process.

8. A method of monitoring a process and determining its condition, comprising the steps of:

collecting initial data characteristic of a process;

producing a first set of virtual data including the step of applying a system state analyzation to the initial data;

using a computer to produce a second set of virtual data including the step of applying a neural network analyzation to the initial data; and using a computer to apply a parity space analyzation of the first and second set of virtual data and also to the initial data to provide a parity space decision about the condition of the process thereby determining whether the process is deviating from a particular state.

9. The method as defined in claim 8 further including the step of performing a sequential probability ratio test on the first and second set of virtual data to produce system state, sequential probability ratio test decision information about the status of the process.

10. The method as defined in claim 8 further including the step of performing a logic test on the first and second set of virtual data to produce a system state decision.

11. The method as define din claim 8 wherein the step of producing a first set of virtual data comprises performing a vector similarity evaluation analyzation.

12. The method as defined in claim 8 further including the step of performing a sequential probability ratio test on the first and second set of virtual data.

13. The method as defined in claim 12 further including the step of performing a parity space analyzation of the first and second set of virtual data and also of the initial data to produce a parity space decision information set about the condition of the process being monitored.

14. The method as defined in claim 8 wherein the process is selected from the group consisting of an industrial, chemical, nuclear, biological, vehicular, financial, avionics ad nautical process.

15. A method of monitoring a process, comprising the steps of:

collecting initial data characteristic of a process;

using a computer to apply a system state analyzation to the initial data to produce system state estimated values which are compared to the initial data to provide system state residual data;

using a computer to apply a sequential probability ratio test to the system state residual data to produce system state sequential probability ratio test decision information;

using a computer to apply a parity space analyzation to the system state estimated values to provide system state, parity space decision information;

applying a neural network analyzation to the initial data to produce neural network estimated values which are compared to the initial data to provide neural network residual data;

using a computer to apply a sequential probability ratio test to the neural network residual data to produce neural network, sequential probability ratio test decision information;

using a computer to apply a parity space analyzation to the initial data to provide initial state, parity space decision information; and using a computer to perform a logic test on the system state parity space decision information, the neural network parity space decision information and the initial state parity space decision information to produce a system state decision about the condition of the process, thereby determining whether the process is deviating from a particular state.

16. The method as defined in claim 15 wherein the step of applying a system state analyzation comprises performing a vector similarity evaluation analyzation.

17. The method as defined in claim 16 wherein the process is selected form the group consisting of an industrial, chemical, nuclear, biological, vehicular, financial, avionics and nautical process.

* * * * *

UNITED STATES PATENT AND TRADEMARK OFFICE
CERTIFICATE OF CORRECTION

PATENT NO. : 6,119,111
DATED : September 12, 2000
INVENTOR(S) : Gross et al.

It is certified that error appears in the above-identified patent and that said Letters Patent is hereby corrected as shown below:

Column 1,
Line 42, "progress has made," should be changed to -- progress has been made --.

Column 2,
Line 36, "it's" should be -- its --.

Column 3,
Line 4, "i" should be -- is --.
Line 25, "4A(i)" should be -- 4A --.
Line 26, "4A(ii)" should be -- 4B --.
Line 27, "4B" should be -- 4C --.
Line 28, "4C(i)" should be -- 4D --.
Line 29, "4C(ii)" should be -- 4E --.
Line 30, "4D" should be -- 4F --.
Line 33, "5A(i)" should be -- 5A --.
Line 34, "5A(ii)" should be -- 5B --.
Line 35, "5B" should be -- 5C --.
Line 37, "6A(i)" should be -- 6A --.
Line 37, "6A(ii)" should be -- 6B --.
Line 38, "6A(iii)" should be -- 6C --.
Line 39, "6B" should be -- 6D --.
Line 41, "6C(i)" should be -- 6E --.
Line 42, "6C(ii)" should be -- 6F --.
Line 43, "6C(iii)" should be -- 6G --.
Line 44, "6D" should be -- 6H --.
Line 46, "7A(i)" should be -- 7A --.
Line 47, "7A(ii)" should be -- 7B --.
Line 47, "7A(iii)" should be -- 7C --.
Line 48, "7B" should be -- 7D --.
Line 58, "30) and" should be --30 and --.

Column 5,
Line 19, "G-$^1$"should be $G^1$ --.

Column 6,
Line 54, "unit;" should be -- unit j; --.

Column 7,
Line 21, "nods" should be -- nodes --.

UNITED STATES PATENT AND TRADEMARK OFFICE
CERTIFICATE OF CORRECTION

PATENT NO. : 6,119,111
DATED : September 12, 2000
INVENTOR(S) : Gross et al.

It is certified that error appears in the above-identified patent and that said Letters Patent is hereby corrected as shown below:

Column 8,
Line 9, "p" should be -- p --.
Equation (19) should be -- $VV_T I_{l-1}$ --.

Column 9,
Equation (26), "$P^2_{lj}$" should be -- $P^2_{\perp j}$ --.

Equation (27), should be -- $P_{\perp 1}^2 \geq P_{\perp 2}^2 \geq \ldots \geq P_{\perp(L-1)}^2 \geq P_{\perp L}^2$ --.
Line 31, "P" should be -- $P^2$ --.
Line 35, should be -- $\hat{m} = \frac{1}{L-1} \sum_{i=1}^{L-1} m_i$ --.

Column 10,
Line 17, "th" should be -- the --.

Column 11,
Line 39, "et" should be -- set --.
Line 42, "FIG. 4" should be -- FIGS. 4A-4F --.
Line 45, "FIG. 5" should be -- FIGS. 5A-5C --.
Table 3 at Sensor No. 1, Negative_a, "-9.16e+04" should be -- -9.16e-.04 --.

Column 12,
Table 3-continued at Sensor No. 23, Men., "-5.67e-.04" shoud be -- 5.67e-04 --.

Column 13,
Table 5 at Sensor No. 1, RMS, "-5.63e+04" should be -- -5.63-04 --.
Table 5 at Sensor No. 11, Min., "-9.58e- -04" should be -- -9.58e-04 --.

Column 15,
Table 8 at Sensor No. 5, 6, 8, 9, and 11, F.A.P., "+0.00e-00" should be -- +0.00e+00 --.
Table 8 at Sensor No. 17, RMS, "+1.04.e-03" should be -- -+1.04e-03 --.
Line 31, "FIG. 6 includes" should be -- FIGS. 6A-6H include --.
Line 34, "FIG. 7" should be -- FIGS. 7A-7D --.

UNITED STATES PATENT AND TRADEMARK OFFICE
CERTIFICATE OF CORRECTION

PATENT NO. : 6,119,111
DATED : September 12, 2000
INVENTOR(S) : Gross et al.

It is certified that error appears in the above-identified patent and that said Letters Patent is hereby corrected as shown below:

<u>Column 16,</u>
First line in Claim 2, "n" should be -- in --.
First line in Claim 11, "define din" should be -- defined in --.

<u>Column 18,</u>
Second line in Claim 17, "form" should be -- from --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*